(12) United States Patent
Bush et al.

(10) Patent No.: US 11,238,757 B2
(45) Date of Patent: Feb. 1, 2022

(54) SHIFTING SUBSTITUTION CIPHER BASED EFFICIENT VAULTLESS DATA TOKENIZATION APPARATUSES, METHODS AND SYSTEMS

(71) Applicant: FMR LLC, Boston, MA (US)

(72) Inventors: Kyle Bush, Raleigh, NC (US); Gang Cheng, Nashua, NH (US)

(73) Assignee: FMR LLC, Boston, MA (US)

(*) Notice: Subject to any disclaimer, the term of this patent is extended or adjusted under 35 U.S.C. 154(b) by 40 days.

(21) Appl. No.: 16/899,558

(22) Filed: Jun. 11, 2020

(65) Prior Publication Data
US 2021/0390884 A1    Dec. 16, 2021

(51) Int. Cl.
G06F 21/00     (2013.01)
G09C 1/00      (2006.01)
H04L 9/08      (2006.01)
H04L 9/06      (2006.01)
G06F 21/62     (2013.01)

(52) U.S. Cl.
CPC ............ G09C 1/00 (2013.01); G06F 21/6245 (2013.01); H04L 9/0631 (2013.01); H04L 9/0861 (2013.01)

(58) Field of Classification Search
None
See application file for complete search history.

(56) References Cited

U.S. PATENT DOCUMENTS

| 10,153,897 B1 * | 12/2018 | Jezewski | H04L 9/3013 |
| 10,936,744 B1 * | 3/2021 | Trepetin | H04L 9/002 |
| 2013/0046994 A1 * | 2/2013 | Shaw | H04L 9/0866 713/189 |

(Continued)

OTHER PUBLICATIONS

Hasija, Hitesh; Katarya, Rahul. Secure code assignment to alphabets using modified ant colony optimization along with compression. 2014 International Conference on Advances in Computing, Communications and Informatics (ICACCI). https://ieeexplore.ieee.org/stamp/stamp.jsp?tp=&arnumber=6968499 (Year: 2014).*

(Continued)

*Primary Examiner* — Jeremiah L Avery
(74) *Attorney, Agent, or Firm* — Hanchuk Kheit LLP; Walter G. Hanchuk

(57) ABSTRACT

The Shifting Substitution Cipher Based Efficient Vaultless Data Tokenization Apparatuses, Methods and Systems ("VDT") transforms tokenized data storage request, detokenized data retrieval request, tokenized data retokenization request inputs via VDT components into tokenized data storage response, detokenized data retrieval response, tokenized data retokenization response outputs. A tokenized data storage request datastructure is obtained. Data type and data type instance of a plaintext data value are determined. A first data tokenization key token for the data type instance is determined. A first data shift position for the first data tokenization key token is calculated. A first tokenized data value is generated by translating the plaintext data value from a plaintext alphabet to a first shifted ciphertext data alphabet generated by shifting the first data tokenization key token using the first data shift position. A first token envelope datastructure comprising the first tokenized data value and first data shift position is generated.

18 Claims, 14 Drawing Sheets

(56) References Cited

U.S. PATENT DOCUMENTS

2015/0095658 A1* 4/2015 Spalka .................. G06F 16/235
                                                        713/190
2017/0063530 A1* 3/2017 Fiske .................... H04L 9/0891
2018/0075253 A1* 3/2018 Auh .................... G06F 21/6227

OTHER PUBLICATIONS

Elkamchouchi, Hassan M. Rotor cipher with time controlled key and encryption process (RTCKP). 2009 National Radio Science Conference. https://ieeexplore.ieee.org/stamp/stamp.jsp?tp=&arnumber=5233978 (Year: 2009).*

* cited by examiner

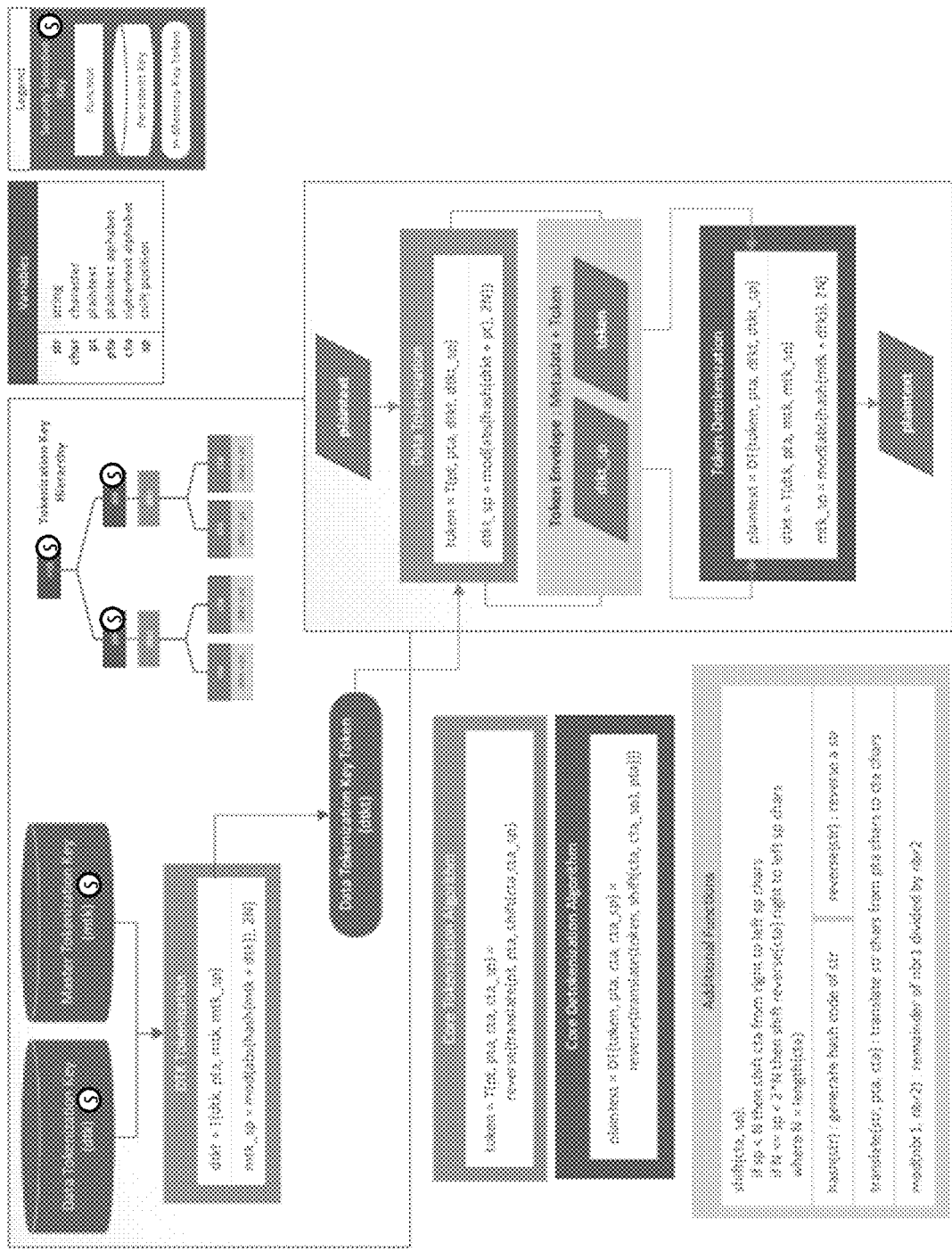
FIGURE 1: VDT ARCHITECTURE

| Charset | Data Type | Example |
|---|---|---|
| [0-9] | Digit | Salary, SSN, phone number, credit cards |
| [a-z] or [A-Z] | Lower or Upper Alpha | Special or sensitive acronyms |
| [a-zA-Z] | Mixed Alpha | Name, State, email body, English sentence, paragraph |
| [a-zA-Z0-9] | Alphanumeric | Street address |
| [a-zA-Z0-9] plus `\!@#$%^&*()-+=[]{}\|;'<>,."/` | Printable | Sentence, email, paragraph |
| 4-byte Unicode | Unicode | I18N name, email, sentence and paragraph |

FIGURE 2: VDT IMPLEMENTATION CASE

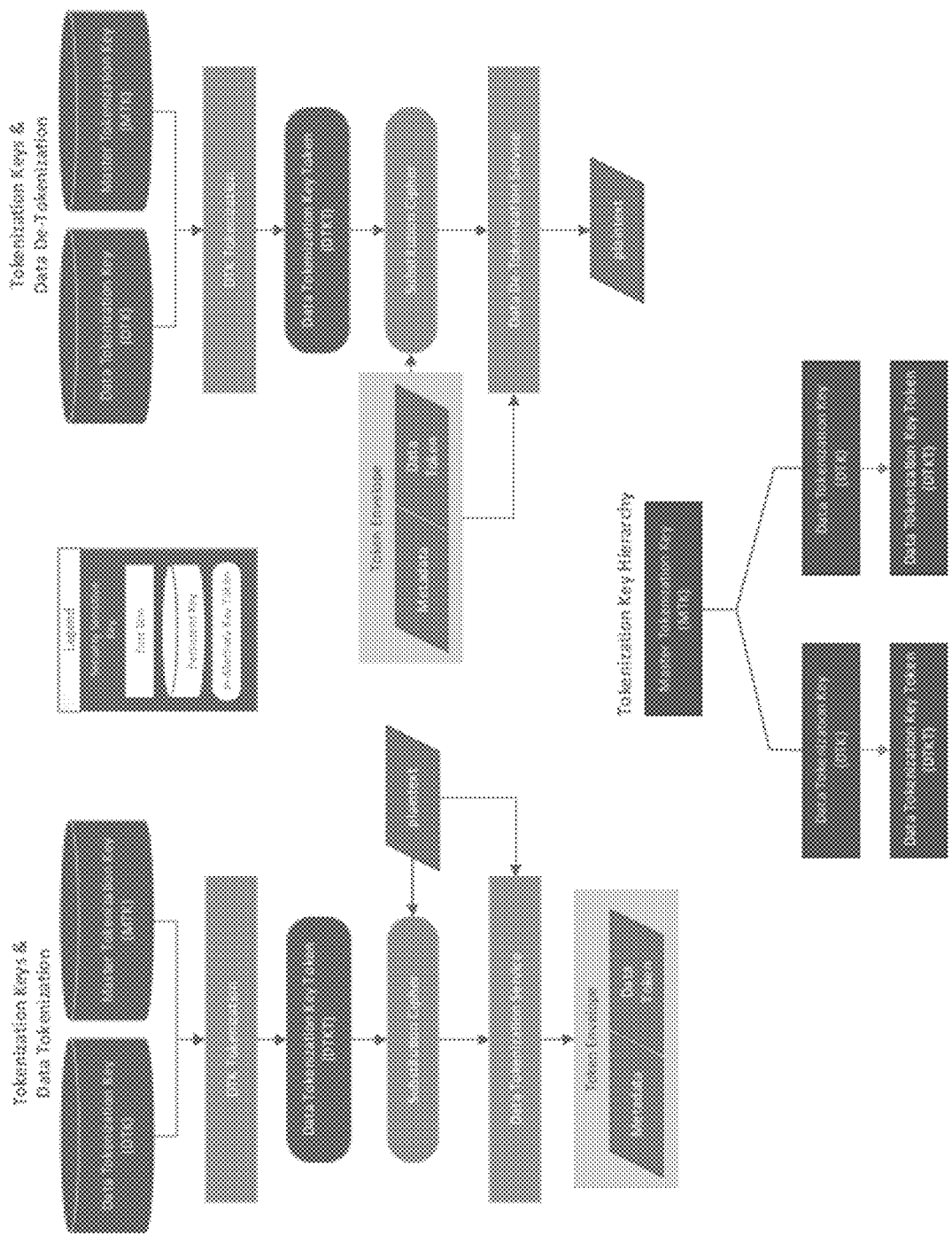
FIGURE 3: VDT ARCHITECTURE

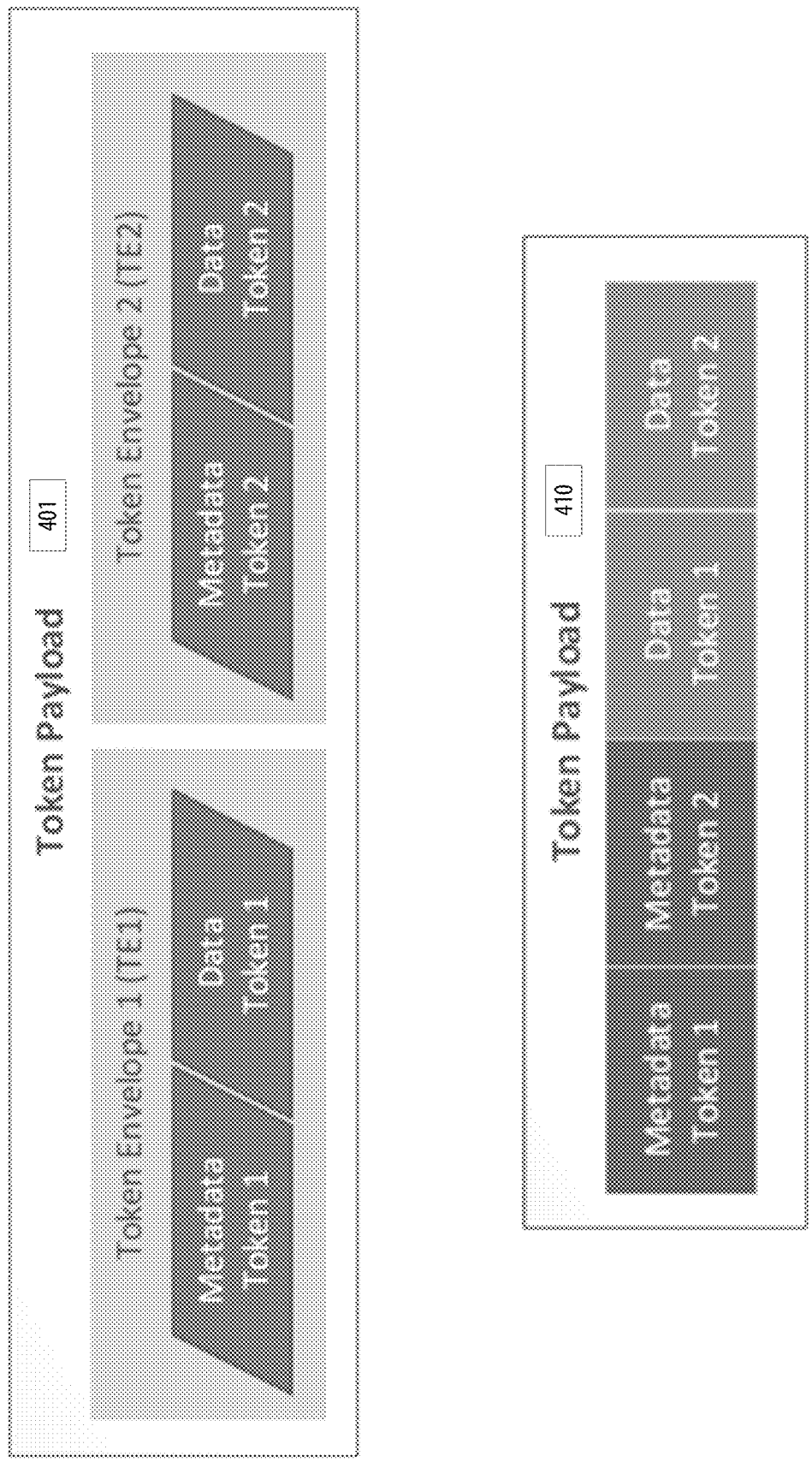
FIGURE 4: VDT ARCHITECTURE

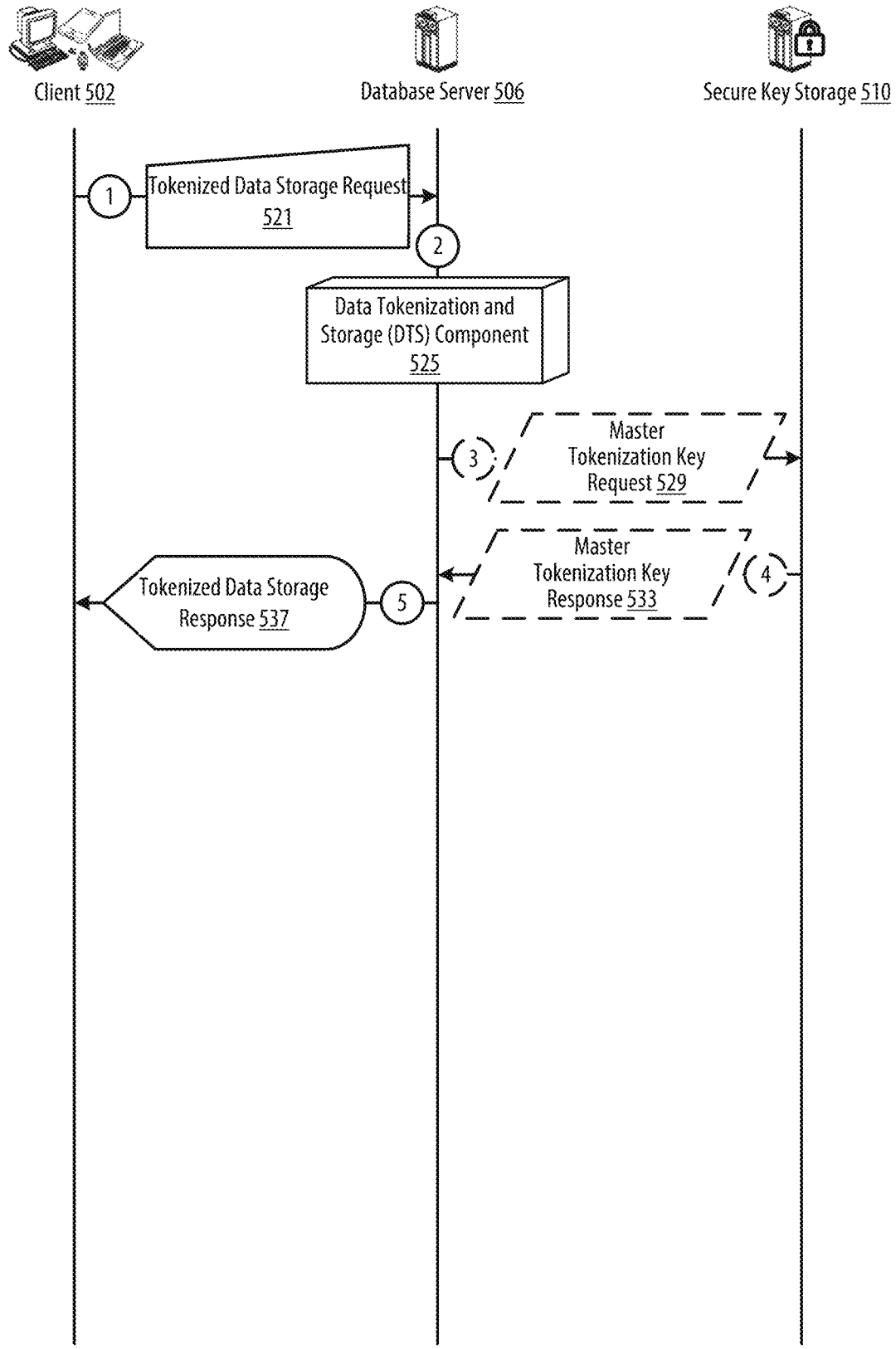
FIGURE 5: VDT DATA FLOW

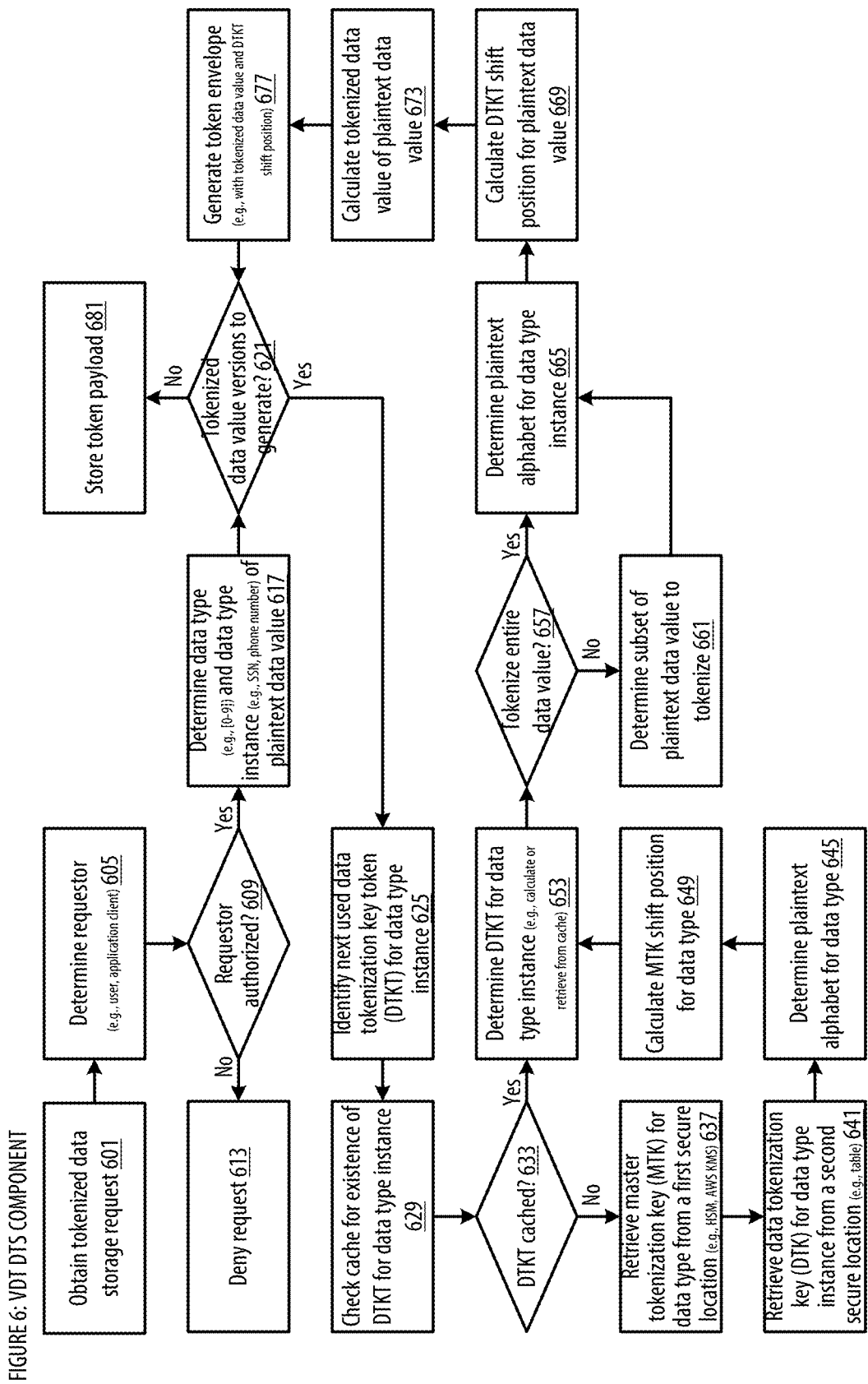
FIGURE 6: VDT DTS COMPONENT

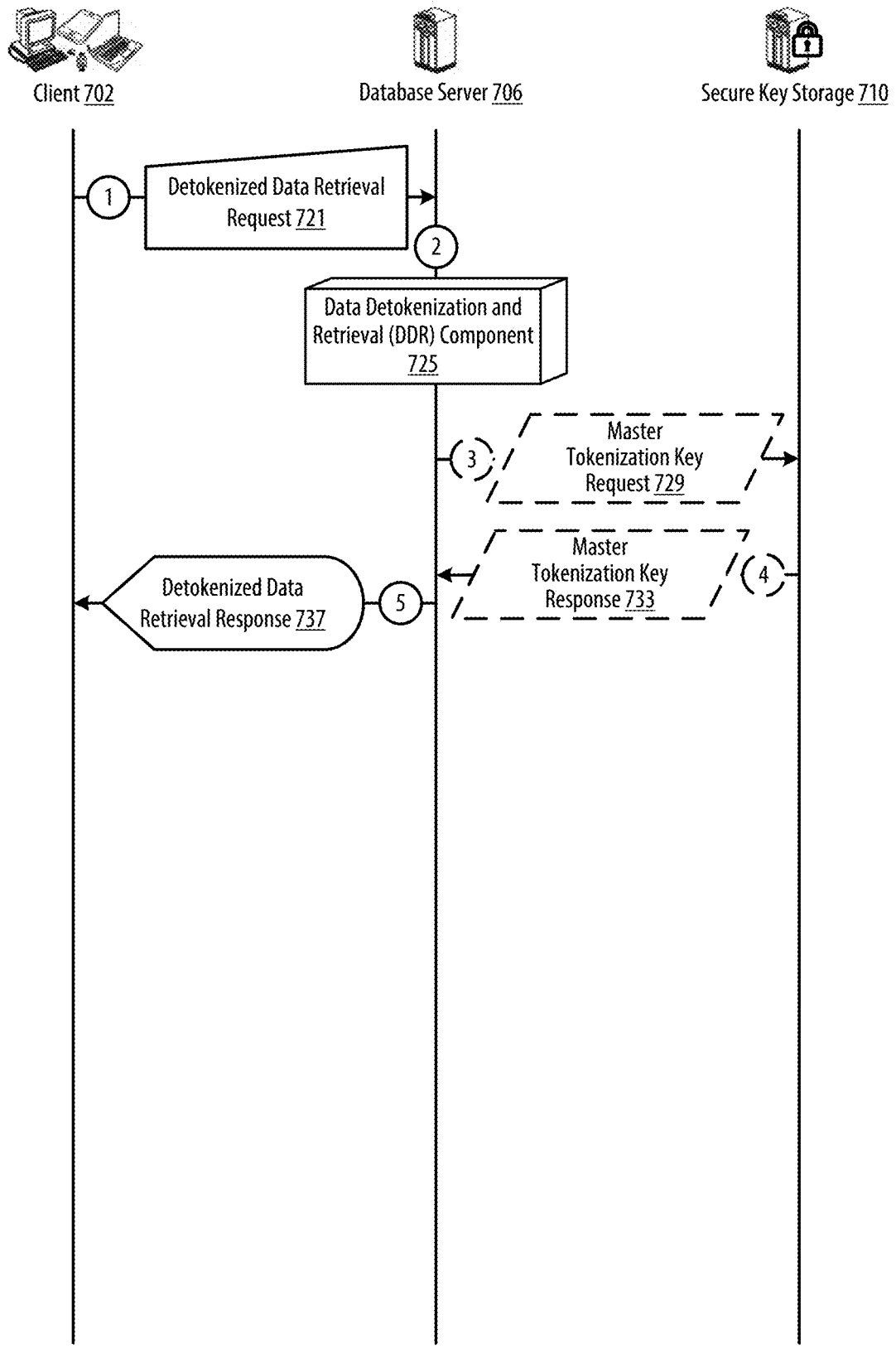

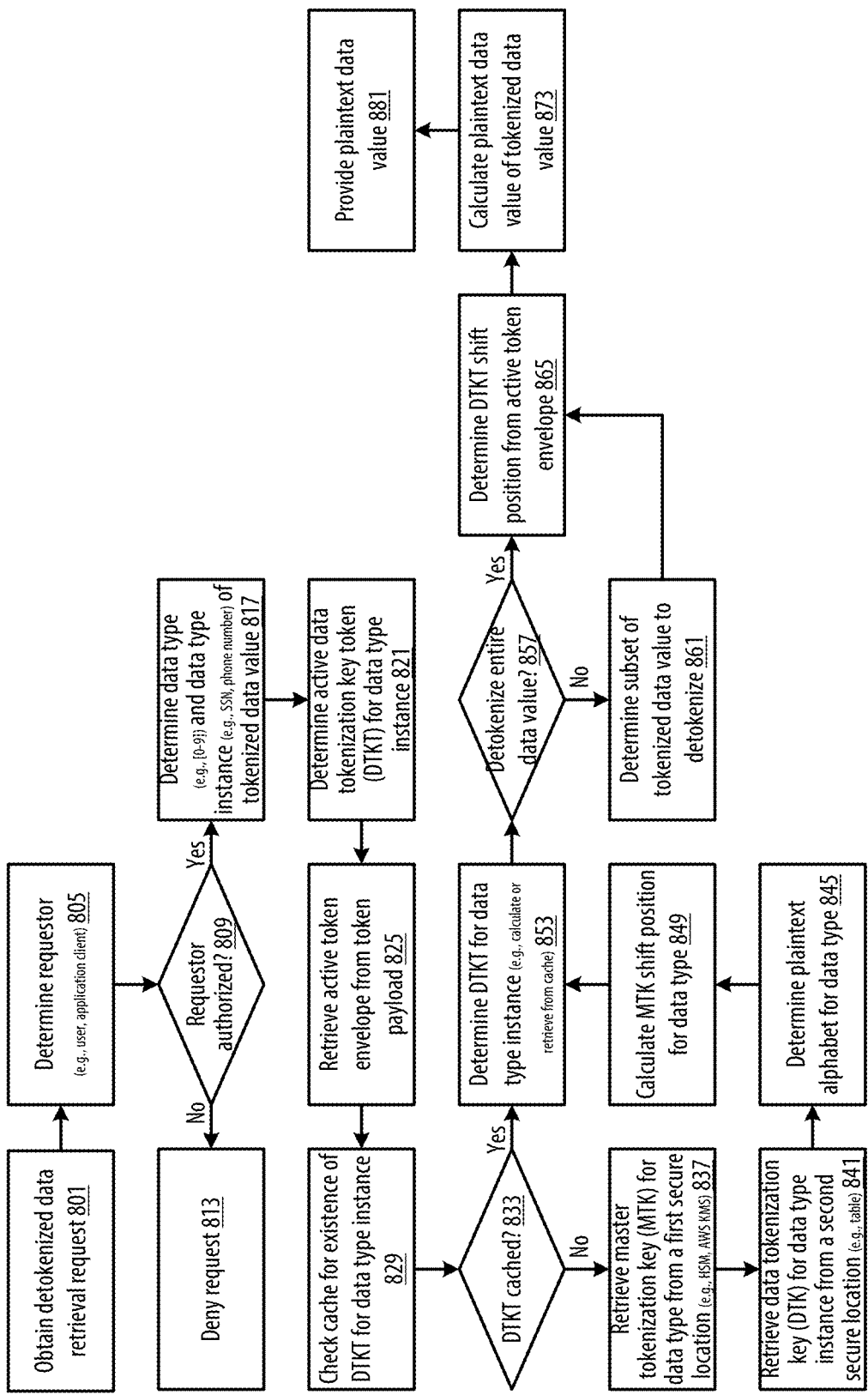

| | 901 | | | 905 | | | 910 | |
|---|---|---|---|---|---|---|---|---|
| Update TABLE_A set COL_B = COL_A | | | Update TABLE_A set COL_B = Tokenize(COL_A) | | | Update TABLE_A set COL_C = De-Tokenize(COL_B) | | |
| Run # | Records Updated | Elapsed Time (sec.) | Run # | Records Updated | Elapsed Time (sec.) | Run # | Records Updated | Elapsed Time (sec.) |
| 1 | 59,986,052 | 29.65 | 1 | 59,986,052 | 55.98 | 1 | 59,986,052 | 34.91 |
| 2 | 59,986,052 | 27.75 | 2 | 59,986,052 | 56.91 | 2 | 59,986,052 | 31.55 |
| 3 | 59,986,052 | 28.54 | 3 | 59,986,052 | 55.91 | 3 | 59,986,052 | 30.99 |

FIGURE 9: VDT IMPLEMENTATION CASE

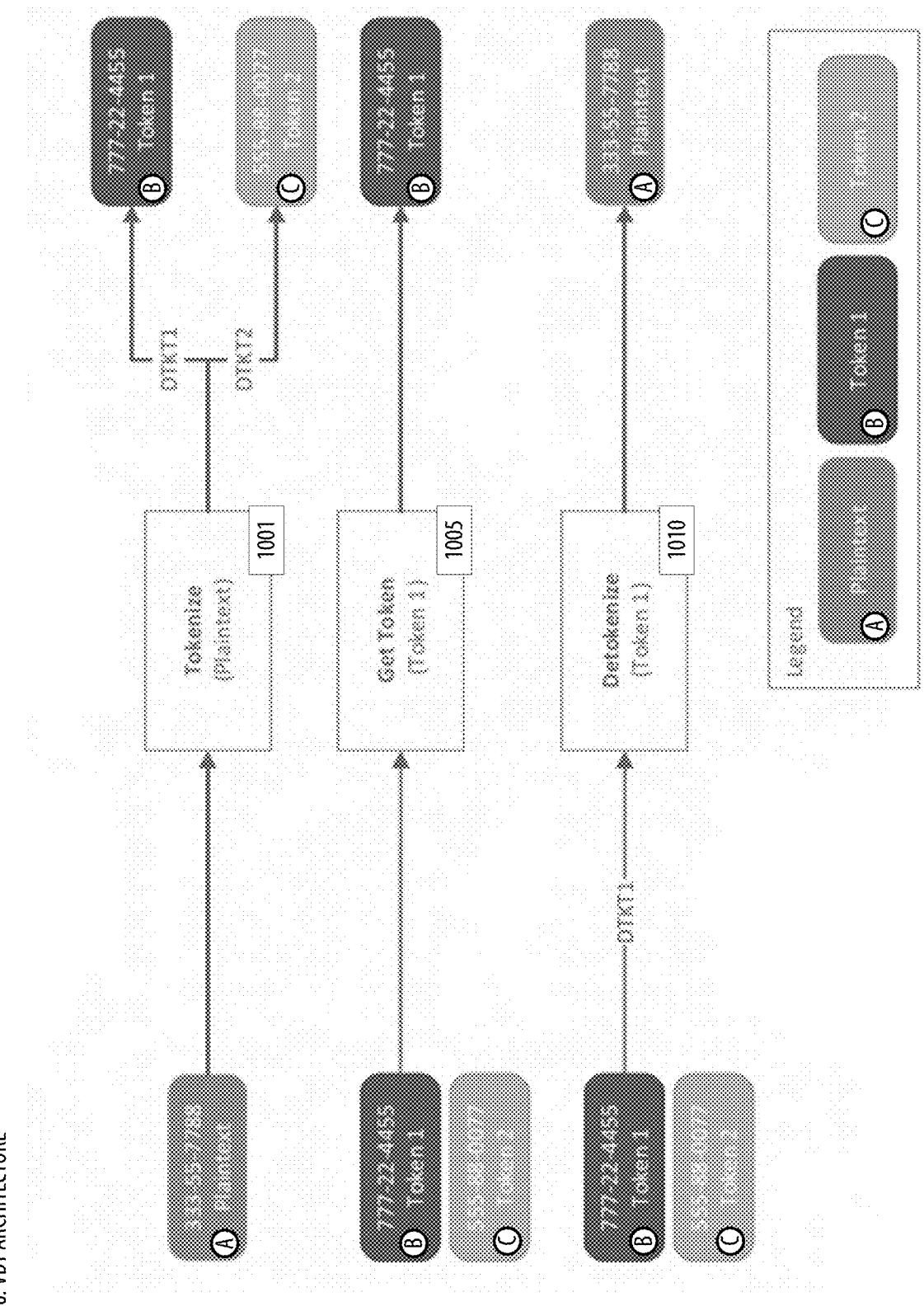
FIGURE 10: VDT ARCHITECTURE

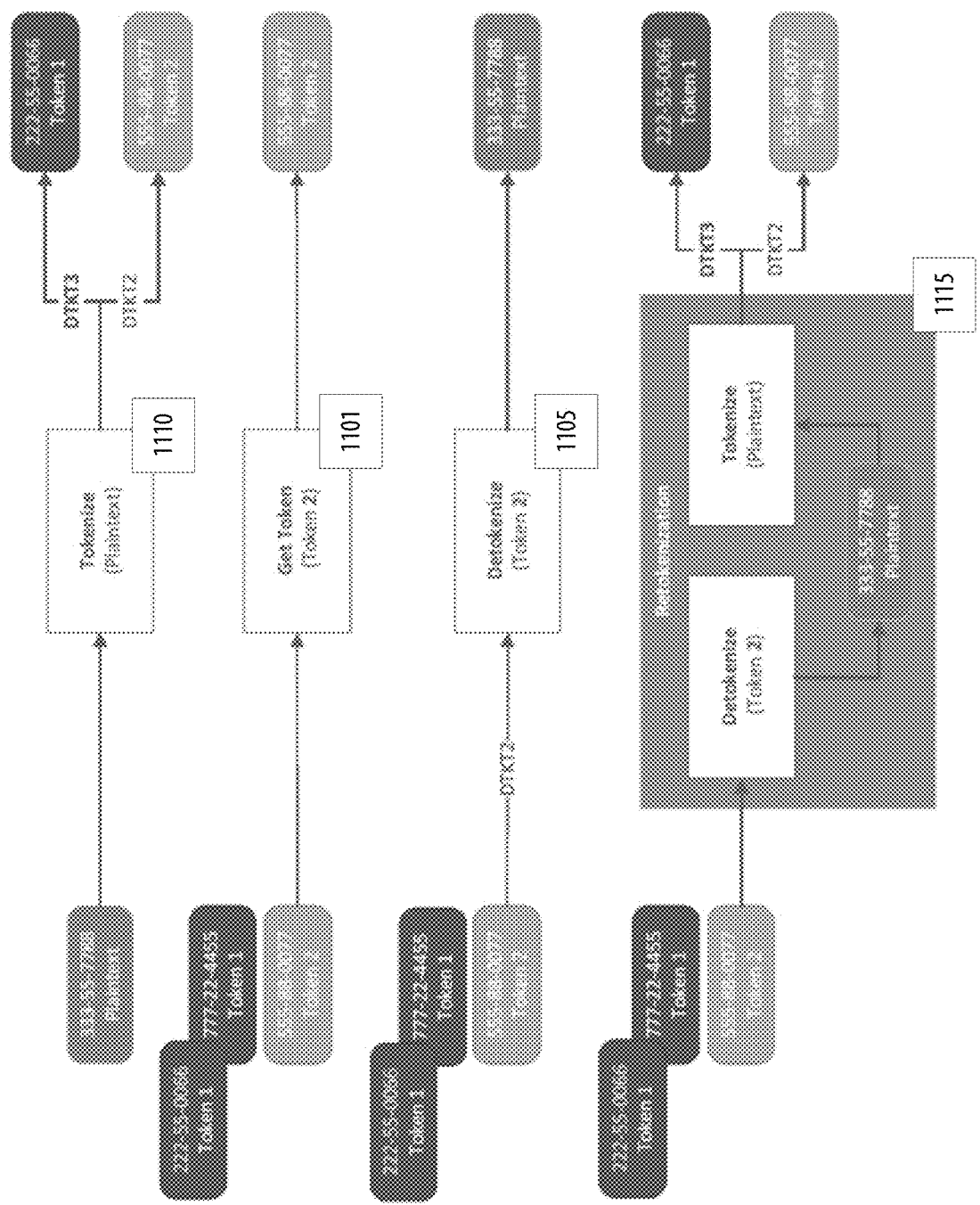
FIGURE 11: VDT ARCHITECTURE

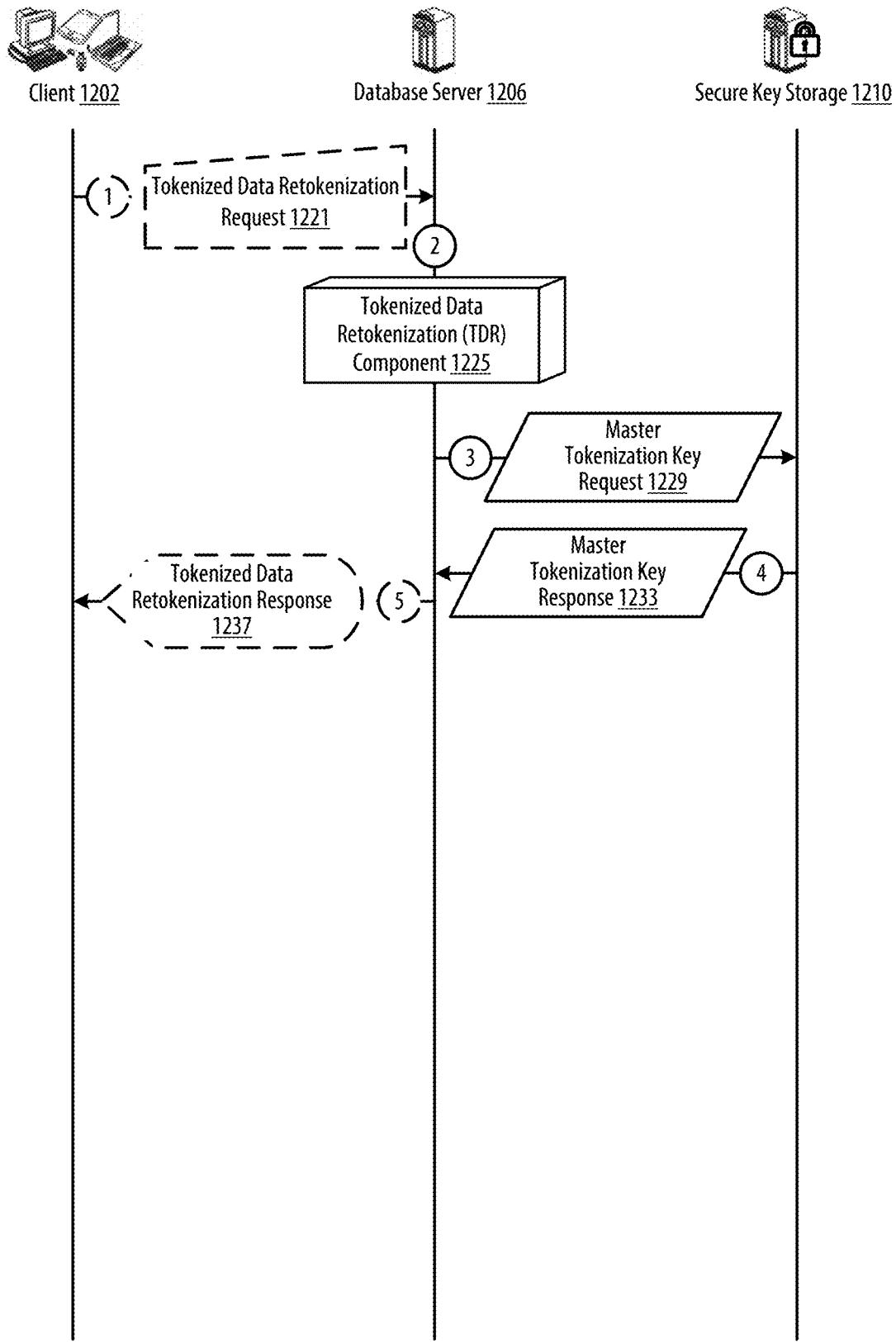
FIGURE 12: VDT DATA FLOW

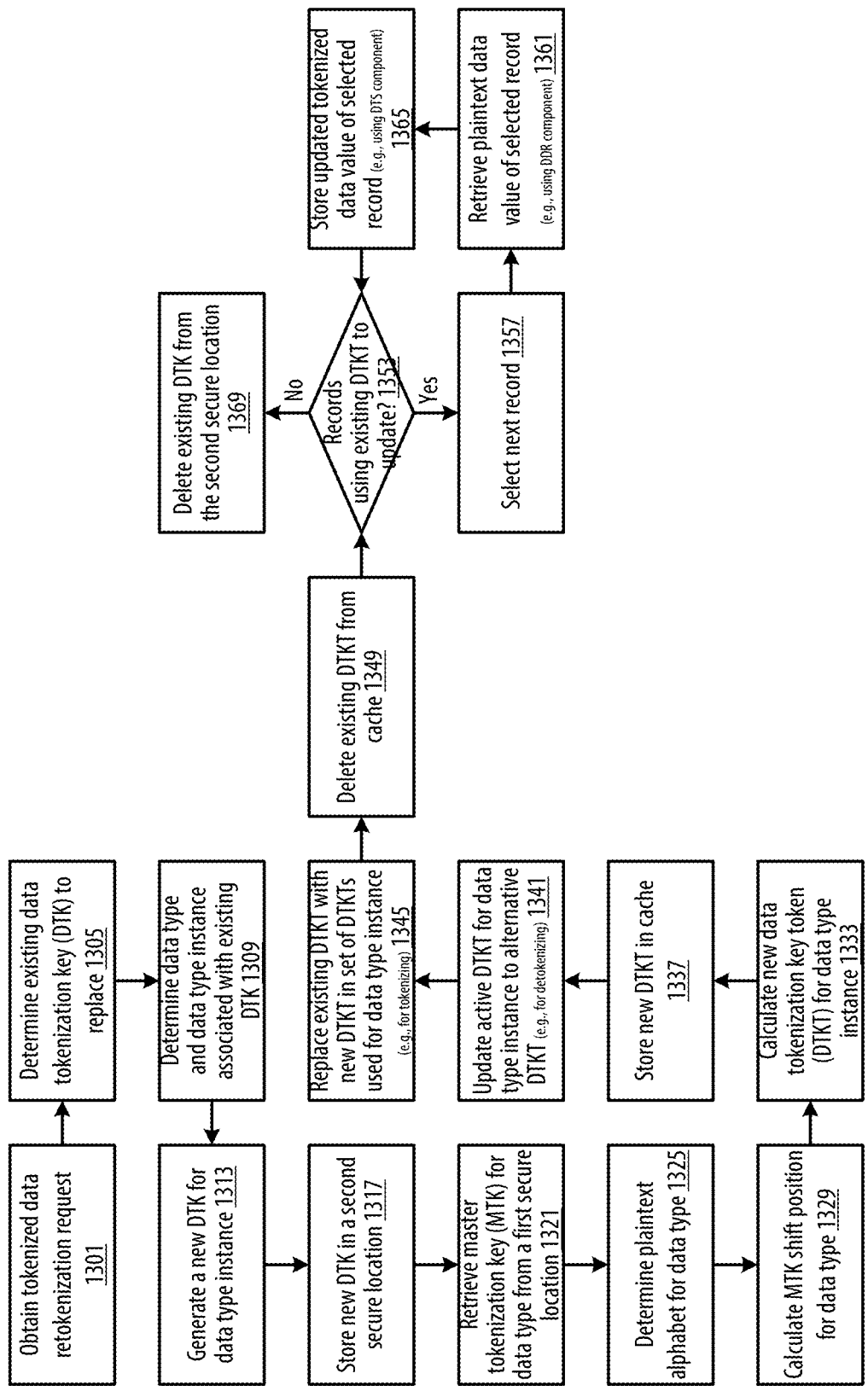
FIGURE 13: VDT TDR COMPONENT

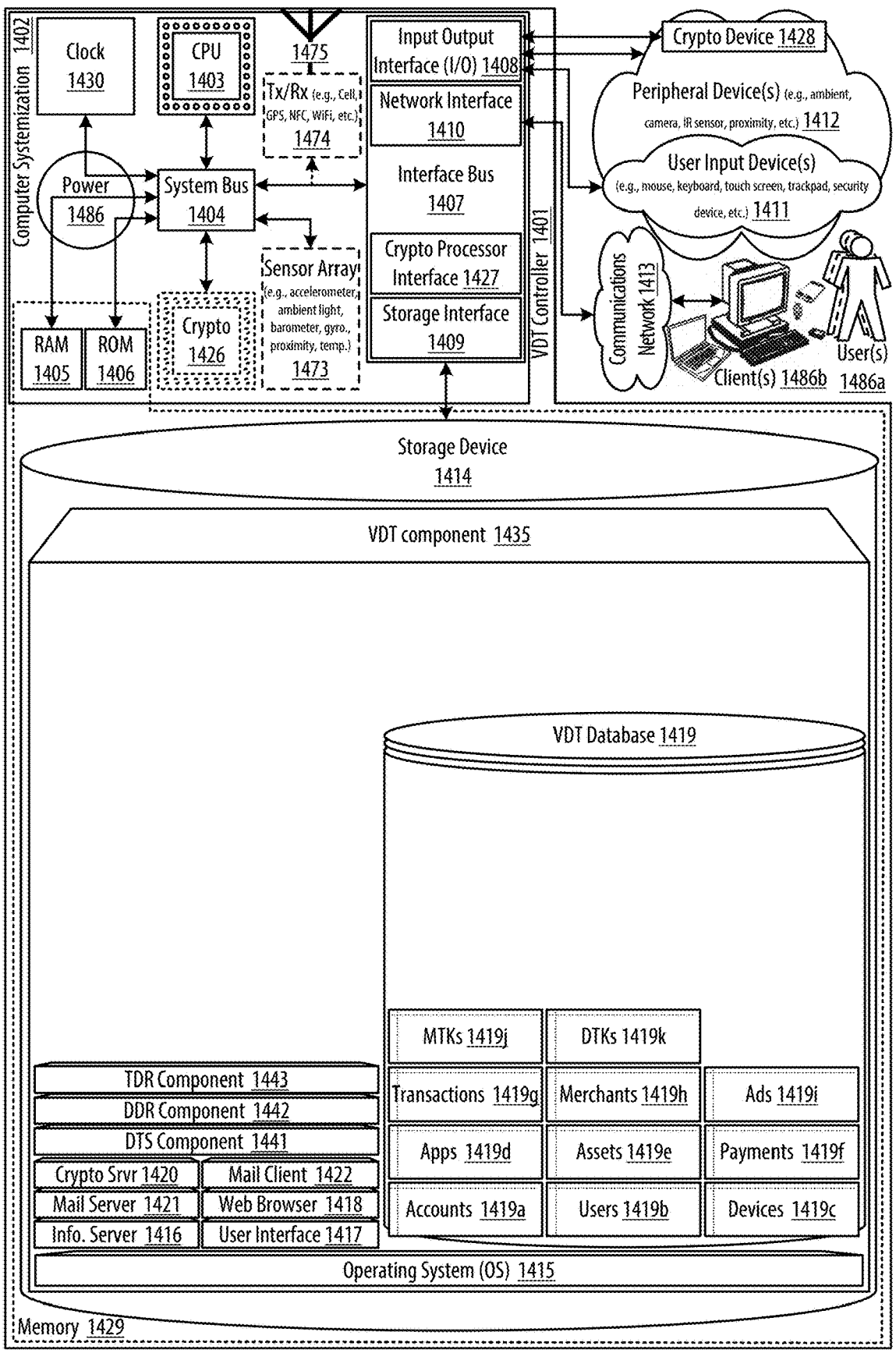
FIGURE 14: VDT Controller

SHIFTING SUBSTITUTION CIPHER BASED EFFICIENT VAULTLESS DATA TOKENIZATION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information security, and more particularly, include Shifting Substitution Cipher Based Efficient Vaultless Data Tokenization Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Database systems facilitate storage of various unstructured and structured data. Some database systems are used to store sensitive data such as social security numbers, names, street addresses, email addresses, phone numbers, and credit card numbers.

BRIEF DESCRIPTION OF THE DRAWINGS

Appendices and/or drawings illustrating various, non-limiting, example, innovative aspects of the Shifting Substitution Cipher Based Efficient Vaultless Data Tokenization Apparatuses, Methods and Systems (hereinafter "VDT") disclosure, include:

FIG. 1 shows an architecture for the VDT;
FIG. 2 shows implementation case(s) for the VDT;
FIG. 3 shows an architecture for the VDT;
FIG. 4 shows an architecture for the VDT;
FIG. 5 shows a datagraph illustrating data flow(s) for the VDT;
FIG. 6 shows a logic flow illustrating embodiments of a data tokenization and storage (DTS) component for the VDT;
FIG. 7 shows a datagraph illustrating data flow(s) for the VDT;
FIG. 8 shows a logic flow illustrating embodiments of a data detokenization and retrieval (DDR) component for the VDT;
FIG. 9 shows implementation case(s) for the VDT;
FIG. 10 shows an architecture for the VDT;
FIG. 11 shows an architecture for the VDT;
FIG. 12 shows a datagraph illustrating data flow(s) for the VDT;
FIG. 13 shows a logic flow illustrating embodiments of a tokenized data retokenization (TDR) component for the VDT;
FIG. 14 shows a block diagram illustrating embodiments of a VDT controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Shifting Substitution Cipher Based Efficient Vaultless Data Tokenization Apparatuses, Methods and Systems (hereinafter "VDT") transforms tokenized data storage request, detokenized data retrieval request, tokenized data retokenization request inputs, via VDT components (e.g., DTS, DDR, TDR, etc. components), into tokenized data storage response, detokenized data retrieval response, tokenized data retokenization response outputs. The VDT components, in various embodiments, implement advantageous features as set forth below.

INTRODUCTION

The VDT provides unconventional features (e.g., efficiently protects sensitive data at-rest and/or in-transit by tokenizing both structured and unstructured data into token envelopes using a substitution cipher) that were never before available in information security.

In various embodiments, the VDT may provide the following features:
High speed and performance
Portable to multiple languages and implementations
Vaultless tokenization based on a substitution cipher
Tokenization key hierarchy to secure and manage tokenization ciphers
Supports the generation of deterministic and/or randomized tokenization keys
Efficient functions to generate shifted ciphertext to tokenize and detokenize data
Multiple layers for abstraction of token and metadata stored as a token envelope
Token storage designed to support seamless, zero-downtime token rotation and re-tokenization

VDT

FIG. 1 shows an architecture for the VDT. In FIG. 1, an embodiment of how the VDT may be utilized to tokenize and detokenize data is illustrated. In one embodiment, the VDT utilizes the following tokenize and detokenize functions:

Tokenize (T) Function
 token=T(pt, pta, cta, sp) where
  pt=plaintext input to be tokenized
  pta=plaintext alphabet consisting of set of characters (e.g., full ASCII table)
  cta=ciphertext alphabet of randomly mixed or rearranged characters from plaintext alphabet
  sp=shift position where $0<=sp<length(cta)$ T performs a shifted substitution cipher by:
1. scta=shift(cta, sp)
    Right-to-left circular shift sp number of characters from beginning of cta
2. token=translate(pt, pta, scta)
    Generate a substitution cipher of plaintext pt using plaintext alphabet pta and ciphertext alphabet scta
3. token=reverse(token)
    Return a reversed token string Detokenize (DT) Function
plaintext=DT(token, pta, cta, sp)
DT performs the reverse of the shifted substitution cipher by:
1. plaintext=reverse(translate(token, Shift(cta, sp), pta)

In one implementation, the tokenization is applied into two chained processes/functions:
1. Key Tokenization—tokenization of ciphertext alphabet keys in a hierarchy
2. Data Tokenization—tokenization of plaintext data using a key token into a token and detokenizing back into plaintext As shown in FIG. 1, in one implementation, the VDT may provide the following services:

Data Tokenization Service:
  Uses the tokenization function to turn plaintext into a data token using a dynamically generated key token as cyphertext alphabet, and a shift position calculated from a numeric hash code of the combined plaintext and key token.
  A key token is in turn created from the tokenization function using a persistent data tokenization key as plaintext, a persistent tokenization master key as cyphertext alphabet, and a deterministic shift position.

Data De-tokenization Service:
  Uses the detokenization function to translate a data token back to its original plaintext using a dynamically recovered key token as a ciphertext alphabet and the shift position in metadata.
  A key token is created with the tokenization function using the same data tokenization key as plaintext, the master key as cyphertext alphabet, and the key token shift position in the metadata.

In one implementation, the shift position(s) generated in the tokenization process are stored and/or transported together with the data token and metadata as a token envelope for efficient detokenization.

In one embodiment, the VDT tokenization implementation is designed to support the following categories of implementation cases on tokenization data types:

Non-Format-Preserving (NFP) Tokenization: tokens are not in the same alphabet and length as the plaintexts. For example, if tokens are UTF8 encoded, an NFP alphabet may be an alphabet that uses the full 4-bytes Unicode charset.

Format-Preserving (FP) Tokenization: tokens are in the same alphabet and length as the plaintexts. See FIG. 2 for an example of FP alphabets that may be supported.

FIG. 2 shows implementation case(s) for the VDT. In FIG. 2, an example of FP alphabets that may be supported is illustrated. Each row shows a supported FP alphabet. The charset column shows the charset associated with a FP alphabet. The data type column shows the data type associated with a FP alphabet. The example column shows exemplary data type instances of the data type associated with a FP alphabet.

FIG. 3 shows an architecture for the VDT. In FIG. 3, an embodiment of tokenization key hierarchy that may be utilized to facilitate key and data tokenization and detokenization is illustrated. In one embodiment, three tokenization keys (e.g., master tokenization key (MTK), data tokenization key (DTK), data tokenization key token (DTKT)) are utilized to separate out the most sensitive ciphertext objects from data tokenization services and processes. These keys may be organized hierarchically such that keys at a higher level protect lower level keys for better separation of key protection from data tokenization process and access control. A top-most master key (e.g., MTK for a data type) may be utilized for tokenizing children data tokenization keys (e.g., DTKs for data type instances) into key tokens (e.g., DTKTs) as randomly generated ciphertext alphabets for the actual data tokenization of plaintext data.

Tokenization Keys Embodiments
In one implementation, tokenization keys may have the following characteristics:
  Keys for the same charset of plaintext and token have the same charset as they are substitution ciphertext alphabet used for tokenization. Keys share the same key length as alphabet size (e.g., for [a-zA-Z0-9] key length=62 bytes).
  Keys are securely randomly picked out of a large key permutation space (e.g., NFP charset is 1024!). In one embodiment, DTKs and/or MTKs may be securely randomly generated and deployed at deployment time (e.g., automatically via a Continuous Integration/Continuous Deployment (CI/CD) pipeline). In one embodiment, DTKs and/or MTKs may be generated using a Deterministic Random Bit Generator (DRBG) that conforms to NIST SP 800-90A, and has been seeded with at least two separate cryptographically secure sources of entropy that have been combined in a cryptographically secure manner (e.g., SHA256[UnguessableFactor1+UnguessableFactor2]).

MTK
An MTK is used to tokenize a DTK into a deterministic key token for data tokenization. For example, a single MTK may be utilized for NFP data types, while each FP data type may have a separate MTK. There may be multiple DTKs of an MTK each covering tokenization of a specific data type instance. For example, Name and State may have two different DTKs of the same MTK.
In one embodiment, an MTK may be centrally stored and/or managed. In one implementation, it may be stored externally to token data store (e.g., Snowflake cloud data warehouse, a database) and to the tokenization process. For example, the MTK may be stored in a hardware security module (HSM), in Amazon Web Services (AWS) Key Management Service (KMS), and/or the like.
Compromise of an MTK alone does not directly and immediately jeopardize data tokens, as the data tokenization key of a data token or access to the DTK tokenization process would also be needed in order to detokenize the token.

DTK
A DTK is used to tokenize plaintext values of a specific data type. This is achieved by generating key tokens from a DTK where each key token is used to tokenize a plaintext value as a ciphertext alphabet.
DTKs are independent of each other and each is used to tokenize and/or detokenize one or more specific data type instances. For example, one DKT may be used for Date of Birth, another DTK may be used for SSN and/or phone number, etc. Access to a DTK may be authorized to specific clients who are given the permission to detokenize the tokens.

A DTK is indirectly protected by the MTK such that the DTK's compromise alone cannot be used to detokenize its data tokens, without either compromising the MTK or being able to gain access to the DTK tokenization process.

Like the MTK, DTKs may be stored externally with the same or different at-rest key storage protection and access control. Alternatively, the MTK and/or DTKs may be stored internally (e.g., inside a secured database table).

DTKT

A DTKT is a key token from a DTK. It is dynamically generated by a tokenization process using the tokenization function where DTK is the plaintext input, MTK is the ciphertext alphabet, and a shift position is either randomly or deterministically determined.

To tokenize a plaintext value, the tokenization function is called using a DTKT as ciphertext alphabet, and a shift position that is calculated from a hashing function which creates a numeric/integer hash value (e.g., Java hashCode( )) on the plaintext and the DTK.

In one implementation, the DTK tokenization service generating DTKT instances may be authorized for use by authenticated users and/or clients and may be access controlled and/or monitored centrally. For example, two factor authentication (2FA) may be used for end users, and OAuth and IP whitelisting may be used for application clients.

DTKTs may be cached for performance and security considerations. When cached, MTK access may be minimized to the first time when DTKTs are created in the cache.

In one embodiment, two types of tokenization schemes may be used in the implementation for usability and security considerations:

1. Single-use or randomized key token: each time the same plaintext is used, a new token is generated based on a random value. This token may be more secure since multiple tokenization invocations on the same plaintext inputs result in different token values. However, this type of token may not be suitable for tokens to be persisted in data store that will be used for cross-reference across multiple storage entities that use multiple tokenization calls (e.g., primary or foreign keys in a relation database management system (RDBMS)). Since a key token (DTKT) is generated in memory, it is a single use token as ciphertext alphabet for data tokens.

2. Multi-use or deterministic data token: same plaintext generates the same token. Depending on the use cases, data tokenization may be implemented to support both single-use and multiuse token generations (e.g., for different types of fields in a RDBMS).

FIG. 1 describes a deterministic token implementation where the two shift positions (mtk_sp, dtkt_sp) are calculated from a hashing function of known inputs that won't change over multiple tokenization invocations. To use the randomized token implementation, the hashing function in FIG. 1 may be replaced with a random number generator (e.g., random(0:2N−1)). In one implementation, using the randomized token implementation also involves storing the mtk_sp in the metadata of the token envelope for detokenization.

In some implementations, such as for database tokenization where tokens of certain table fields should be unique, (e.g., group-by or primary-key/foreign-key columns), fixed-length tokens may not have collisions. In such implementations, a different mod size (e.g., instead of 2N) may be used in the dtkt_sp calculation for different fixed-lengths of a charset, per charset (e.g., dtkt_sp=mod(abs(hash(dtkt+pt), mod_size))). For example, using Java hashCode( ), the following mod sizes are proven to generate tokens with no collisions:

| Charset | Plaintext fixed-length | Mod size |
|---------|------------------------|----------|
| Numeric | 2, 4, 6 | 2 |
| Numeric | 3, 5, 6 | 5 |
| Numeric | 6 | 10 |
| Non-numeric | even | 2 |

For example, for a plaintext with length greater than 6 for a numeric charset, the plaintext may be broken into small blocks of lengths less than or equal to 6 to be tokenized independently to avoid collision; for a non-numeric charset the same procedure may be applied using block size=2.

In some embodiments, due to the use of a random substitution cipher, among the entire large plaintext permutation space, there is a small probability some fixed-length plaintexts may be tokenized into the same plaintexts. In some implementations, given a randomly selected MTK, a significantly large subset of also randomly selected DTKs exists for a specific fixed-length and may be used to guarantee that no generated token equals to the original plaintext.

In some embodiments, instead of using a reversible tokenization system which supports detokenization, there may be use cases in which irreversible tokens that cannot be detokenized may be utilized. This may be implemented by not storing the two shift positions (mtk_sp, dtkt_sp) in the metadata with the token in the token envelope. The table below provides an exemplary summary of use cases and the different characteristics of the tokenization system. A tokenization implementation may use any combination of the characteristics.

| Use Case | Random (R)/ Deter- ministic (d) | Format Preserving (FP)/ Non-Format Preserving (NFP) | Irreversible (IR)/ Reversible (R) |
|----------|----------------------------------|-----------------------------------------------------|-----------------------------------|
| No need to keep original value (e.g., data masking, unstructured data (email, docs)) | R | NFP | IR |
| Common for OLTP database fields where field is not used as key column and/or not needed for grouping of data | R | FP | R |
| Common for OLAP database fields where field is used as key column and/or needed for grouping of data | D | FP | R |

FIG. 4 shows an architecture for the VDT. In FIG. 4, embodiments of how persisted token data (token payload) may be implemented in the VDT are illustrated. In some embodiments, the token payload may be a single token envelope comprising a metadata token and a data token. In the embodiment shown at 401, the token payload includes two token envelopes each comprising a metadata token and a data token. It is to be understood that the VDT may be configured such that the token payload includes any number of token envelopes.

Storing two versions of the token data (e.g., a first version in TE1 associated with a first DTK and a second version in TE2 associated with a second DTK) may provide the following benefits:
  Minimize impact to consumers and producers of the tokenized/de-tokenized data during retokenization due to key rotation.
  Provide redundancy and recoverability if one of the two DTKs is corrupted or accidently deleted.

In various implementations, the token payload may be formatted in a variety of ways and stored in a fixed position, delimited or semi-structured (e.g., JSON, Avro, etc.) datastructure. In the embodiment shown at 410, a formatted string token payload using a fixed position format (e.g., assuming metadata is of fixed size) is illustrated.

FIG. 5 shows a datagraph illustrating data flow(s) for the VDT. In FIG. 5, dashed lines indicate data flow elements that may be more likely to be optional. In FIG. 5, a client 502 (e.g., of a user) may send a tokenized data storage request 521 to a database server 506 to facilitate storing plaintext data as tokenized data. For example, the client may be a desktop, a laptop, a tablet, a smartphone, a smartwatch, and/or the like that is executing a client application. In one implementation, the tokenized data storage request may include data such as a request identifier, a requestor identifier, authentication data, plaintext data type, plaintext data type instance, plaintext data value, plaintext data value subset to tokenize, and/or the like. In one embodiment, the client may provide the following example tokenized data storage request, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL
                <digital_cert_link>www.mydigitalcertificate.com/JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details>//iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>VDT.app</app_name>
        <app_version>1.0</app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9.3</client_OS_version>
        <client_app_type>web browser</client_app_type>
```

```
<client_name>Mobile Safari</client_name>
<client_version>537.75.14</client_version>
</client_details>
<tokenized_data_storage_request>
    <request_identifier>ID_request_1</request_identifier>
    <requestor_identifier>ID_user_1</requestor_identifier>
    <authentication_data>requestor's authentication token</authentication_data>
    <plaintext_data_type>Digit</plaintext_data_type>
    <plaintext_data_type_instance>SSN</plaintext_data_type_instance>
    <plaintext_data_value>333557788</plaintext_data_value>
    <subset_to_tokenize>ALL</subset_to_tokenize>
</tokenized_data_storage_request>
</auth_request>
```

A data tokenization and storage (DTS) component 525 may utilize data provided in the tokenized data storage request to store plaintext data as tokenized data. See FIG. 6 for additional details regarding the DTS component.

If a data tokenization key token for the plaintext data type instance has not been cached, the database server 506 may send a master tokenization key request 529 to a secure key storage 510 (e.g., HSM, AWS KMS) to retrieve the master tokenization key for the plaintext data type. In one implementation, the master tokenization key request may include data such as a request identifier, a requestor identifier, authentication data, the plaintext data type, and/or the like. In one embodiment, the database server may provide the following example master tokenization key request, substantially in the form of a HTTP(S) POST message including XML-formatted data, as provided below:

```
POST/master_tokenization_key_request.php HTTP/1.1
Host: www.server.com
Content-Type: Application/XML
Content-Length: 667
<?XML version="1.0" encoding="UTF-8"?>
<master_tokenization_key_request>
    <request_identifier>ID_request_2</request_identifier>
    <requestor_identifier>ID_tokenization_process_1</requestor_identifier>
    <authentication_data>requestor's authentication token</authentication_data>
    <plaintext_data_type>Digit</plaintext_data_type>
</master_tokenization_key_request>
```

The secure key storage 510 may send a master tokenization key response 533 to the database server 506 with the requested master tokenization key. In one implementation, the master tokenization key response may include data such as a response identifier, the requested master tokenization key, and/or the like. In one embodiment, the secure key storage may provide the following example master tokenization key response, substantially in the form of a HTTP(S) POST message including XML-formatted data, as provided below:

```
POST/master_tokenization_key_response.php HTTP/1.1
Host: www.server.com
Content-Type: Application/XML
Content-Length: 667
<?XML version="1.0" encoding="UTF-8"?>
<master_tokenization_key_response>
    <response_identifier>ID_response_2</response_identifier>
    <master_tokenization_key>MTK</master_tokenization_key>
</master_tokenization_key_response>
```

The database server 506 may send a tokenized data storage response 537 to the client 502 to inform the user whether the tokenized data was stored successfully. In one implementation, the tokenized data storage response may include data such as a response identifier, a status, and/or the like. In one embodiment, the database server may provide the following example tokenized data storage response, substantially in the form of a HTTP(S) POST message including XML-formatted data, as provided below:

```
POST/tokenized_data_storage_response.php HTTP/1.1
Host: www.server.com
Content-Type: Application/XML
Content-Length: 667
<?XML version="1.0" encoding="UTF-8"?>
<tokenized_data_storage_response>
    <response_identifier>ID_response_1</response_identifier>
    <status>OK</status>
</tokenized_data_storage_response>
```

FIG. 6 shows a logic flow illustrating embodiments of a data tokenization and storage (DTS) component for the VDT. In FIG. 6, a tokenized data storage request may be obtained at 601. For example, the tokenized data storage request may be obtained via a SQL-based Snowflake database command similar to the following:

UPDATE Users
SET userSSN=333557788
WHERE userID=ID_user_1;

A requestor associated with the tokenized data storage request may be determined at 605. In one embodiment, the tokenized data storage request may be obtained as a result of a request from an authenticated user and/or application client to store plaintext data as tokenized data. For example, the user may be authenticated via 2FA. In another example, the application client may be authenticated via OAuth and IP whitelisting. In one implementation, the tokenized data storage request may be parsed (e.g., using PHP commands) to determine the requestor (e.g., based on the value of the requestor_identifier field).

A determination may be made at 609 whether the requestor is authorized to perform the request. In one embodiment, a SQL-based data access layer (e.g., implemented using Snowflake User Defined Functions (UDFs) and database views) may be used to provide controlled access to tokenized and/or detokenized data. In one implementation, the tokenized data storage request may be parsed (e.g., using PHP commands) to determine whether the requestor is authorized to perform the request (e.g., by checking security access based on the value of the authentication_data field). If the requestor is not authorized to perform the request, the request may be denied at 613.

If the requestor is authorized to perform the request, a data type (e.g., Digit) and/or data type instance (e.g., SSN) of a plaintext data value to store may be determined at 617. See FIG. 2 for additional examples of data types and data type instances. In one implementation, the tokenized data storage request may be parsed (e.g., using PHP commands) to determine the data type and/or data type instance of the plaintext data value (e.g., based on the values of the plaintext_data_type and/or plaintext_data_type_instance fields). In another implementation, the data type and/or data type instance of the plaintext data value may be determined based on analysis of the SQL-based database command. For example, if the database command updates the userSSN field of the Users table, the data type and/or data type instance of the specified table's specified field may be used to determine the data type and/or data type instance of the plaintext data value.

A determination may be made at 621 whether there remain tokenized data value versions of the plaintext data value to generate. In one implementation, the VDT may be configured such that multiple (e.g., two) tokenized data value versions (e.g., in token envelopes) of the plaintext data value are generated. If there remain tokenized data value versions of the plaintext data value to generate, the next used data tokenization key token (DTKT) for the data type instance may be identified at 625. For example, each tokenized data value version may be generated using a distinct DTKT. In one implementation, a set of DTKTs may be associated with each data type instance (e.g., using an array of associated DTKT identifiers), and the data type instance's DTKT identifiers array may be checked to determine the next used DTKT.

A cache may be checked for existence of the next used DTKT (e.g., DTKT1, DTKT2) for the data type instance at 629. In one implementation, the cache may be checked for the presence of the identifier (e.g., DTKT1_Id, DTKT2_Id) of the next used DTKT for the data type instance.

If it is determined at 633 that the next used DTKT for the data type instance is not cached, a master tokenization key (MTK) for the data type may be retrieved from a first secure location at 637. For example, the first secure location may be an HSM, an AWS KMS, a secured database table, and/or the like. In one implementation, the MTK for the data type may be retrieved via a master tokenization key request.

A data tokenization key (DTK) for the data type instance, associated with the next used DTKT, may be retrieved from a second secure location at 641. For example, the second secure location may be an HSM, an AWS KMS, a secured database table, and/or the like. In one implementation, the DTK for the data type instance may be retrieved via a SQL-based Snowflake database command similar to the following:

SELECT dataTokenizationKey
FROM DTKs
WHERE associatedDataType="Digit" AND associatedDataTypeInstance="SSN" AND
associatedDTKT_Identifier=DTKT1_Id;

A plaintext alphabet for the data type may be determined at 645. In one implementation, the character set associated with the data type may be determined. For example, the character set associated with data type Digit is [0-9]. In another example, the character set associated with data type Alphanumeric is [a-zA-Z0-9].

An MTK shift position for the data type may be calculated at 649. In one embodiment, the MTK shift position specifies the number of characters by which to shift a ciphertext alphabet (e.g., the MTK) during calculation of the DTKT for the data type instance. In various implementations, the MTK shift position for the data type may be determined using either a deterministic token implementation or a randomized token implementation. For example, the MTK shift position for the data type may be calculated using a deterministic token implementation as follows:

| MTK shift position calculation (deterministic) |
|---|
| mtk_sp = mod(abs(hash(mtk + dtk)), 2N)<br>where,<br>mod = the modulo function<br>abs = the absolute value function |

| MTK shift position calculation (deterministic) |
|---|
| hash = a hash function (e.g., Java hashCode( )) that generates a numeric hash code of a string<br>N = length of the mtk |

In another example, the MTK shift position for the data type may be calculated using a randomized token implementation as follows:

| MTK shift position calculation (randomized) |
|---|
| mtk_sp = mod(abs(random(0:2N-1)), 2N)<br>where,<br>mod = the modulo function<br>abs = the absolute value function<br>random = random number generator function of numbers between minimum and maximum values<br>N = length of the mtk |

The next used DTKT for the data type instance may be determined at 653. In one implementation, the next used DTKT for the data type instance may be retrieved from cache using its identifier. In another implementation, the next used DTKT for the data type instance may be calculated (e.g., via Snowflake UDFs). For example, the next used DTKT for the data type instance may be calculated as follows:

| DTKT calculation |
|---|
| dtkt = T(dtk, pta, mtk, mtk_sp)<br>dtkt = reverse(translate(dtk, pta, shift(mtk, mtk_sp)))<br>where,<br>pta = plaintext alphabet for the data type<br>T = the tokenize function (e.g., that performs a shifted substitution cipher)<br>reverse = a function that reverses a string (e.g., "abc" to "cba")<br>translate = a function that generates a substitution cipher of plaintext dtk using plaintext alphabet pta and a shifted ciphertext alphabet generated by the shift function by translating string characters of dtk from pta characters to characters of the shifted ciphertext alphabet<br>shift = a function that generates a shifted ciphertext alphabet by shifting mtk by mtk_sp characters using a right-to-left circular shift (e.g., if mtk_sp < N then shift mtk from right to left mtk_sp characters, and if N <= mtk_sp < 2N then shift reverse(mtk) right to left mtk_sp characters, where N = length of mtk) |

A determination may be made at 657 whether to tokenize the entire plaintext data value. In some embodiments, instead of tokenizing the entire plaintext data value, a subset of the plaintext data value may be tokenized. For example, instead of tokenizing the entire date of birth field, the day within the date of birth may be tokenized.

If a subset of the plaintext data value should be tokenized, the subset of plaintext data value to tokenize may be determined at 661. In one implementation, the user may specify a subset of the plaintext data value to be tokenized (e.g., via special characters marking the portion to be tokenized), and the tokenized data storage request may be parsed (e.g., using PHP commands) to determine the subset (e.g., based on the value of the subset_to_tokenize field). In another implementation, specific fields may be configured (e.g., via Snowflake UDFs) to tokenize a specified subset of the plaintext data value.

A plaintext alphabet for the data type instance may be determined at 665. In one implementation, the character set associated with the data type instance may be determined. In one embodiment, the plaintext alphabet for the data type instance may be the same as the plaintext alphabet for the data type.

A DTKT shift position for the plaintext data value may be calculated at 669. In one embodiment, the DTKT shift position for the plaintext data value specifies the number of characters by which to shift a ciphertext alphabet (e.g., the DTKT) during calculation of a tokenized data value of the plaintext data value. In various implementations, the DTKT shift position for the plaintext data value may be determined using either a deterministic token implementation or a randomized token implementation. For example, the DTKT shift position for the plaintext data value may be calculated using a deterministic token implementation as follows:

| DTKT shift position calculation (deterministic) |
| --- |
| dtkt_sp = mod(abs(hash(dtkt + pt)), 2N) where, mod = the modulo function abs = the absolute value function hash = a hash function (e.g., Java hashCode( )) that generates a numeric hash code of a string pt = the plaintext data value N = length of the dtkt |

In another example, the DTKT shift position for the plaintext data value may be calculated using a randomized token implementation as follows:

| DTKT shift position calculation (randomized) |
| --- |
| dtkt_sp = mod(abs(random(0:2N-1)), 2N) where, mod = the modulo function abs = the absolute value function random = random number generator function of numbers between minimum and maximum values N = length of the dtkt |

A tokenized data value of the plaintext data value may be calculated at 673. In one implementation, the next tokenized data value version may be calculated using the next used DTKT for the data type instance and the DTKT shift position (e.g., via Snowflake UDFs). For example, the tokenized data value of the plaintext data value may be calculated as follows:

| Tokenized data value calculation |
| --- |
| token = T(pt, pta, dtkt, dtkt_sp) token = reverse(translate(pt, pta, shift(dtkt, dtkt_sp))) where, pt = the plaintext data value pta = plaintext alphabet for the data type instance T = the tokenize function (e.g., that performs a shifted substitution cipher) reverse = a function that reverses a string (e.g., "abc" to "cba") translate = a function that generates a substitution cipher of plaintext pt, using plaintext alphabet pta and a shifted ciphertext alphabet generated by the shift function, by translating string characters of pt from pta characters to characters of the shifted ciphertext alphabet shift = a function that generates a shifted ciphertext alphabet by shifting dtkt by dtkt_sp characters using a right-to-left circular shift (e.g., if dtkt_sp < N then shift dtkt from right to left dtkt_sp characters, and if N <= dtkt_sp < 2N then shift reverse(dtkt) right to left dtkt_sp characters, where N = length of dtkt) |

A token envelope for the next tokenized data value version may be generated at 677. In one implementation, the token envelope may include a metadata token and a data token. The metadata token may include the DTKT shift position. If a randomized token implementation was used to calculate the MTK shift position, the metadata token may also include the MTK shift position. The data token may include the tokenized data value of the plaintext data value.

A token payload may be stored at 681. For example, the token payload may be stored in a token data store (e.g., Snowflake cloud data warehouse, a database). In one embodiment, the token payload my include token envelopes of the generated tokenized data value versions of the plaintext data value. See FIG. 4 for additional details regarding token payloads. In one implementation, the token payload may be constructed from the token envelopes (e.g., via Snowflake UDFs) and/or stored in the token data store (e.g., via SQL-based database commands).

FIG. 7 shows a datagraph illustrating data flow(s) for the VDT. In FIG. 7, dashed lines indicate data flow elements that may be more likely to be optional. In FIG. 7, a client 702 (e.g., of a user) may send a detokenized data retrieval request 721 to a database server 706 to facilitate retrieving plaintext data using stored tokenized data. For example, the client may be a desktop, a laptop, a tablet, a smartphone, a smartwatch, and/or the like that is executing a client application. In one implementation, the detokenized data retrieval request may include data such as a request identifier, a requestor identifier, authentication data, tokenized data type, tokenized data type instance, and/or the like. In one embodiment, the client may provide the following example detokenized data retrieval request, substantially in the form of a HTTP(S) POST message including XML-formatted data, as provided below:

POST/detokenized_data_retrieval_request.php HTTP/1.1

Host: www.server.com

Content-Type: Application/XML

Content-Length: 667

<?XML version="1.0" encoding="UTF-8"?>

<detokenized_data_retrieval_request>

<request_identifier>ID_request_11</request_identifier>

<requestor_identifier>ID_user_1</requestor_identifier>

<authentication_data>requestor's authentication token</authentication_data>

<tokenized_data_type>Digit</tokenized_data_type>

<tokenized_data_type_instance>SSN</tokenized_data_type_instance>

</detokenized_data_retrieval_request>

A data detokenization and retrieval (DDR) component 725 may utilize data provided in the detokenized data retrieval request to retrieve plaintext data using stored tokenized data. See FIG. 8 for additional details regarding the DDR component.

If a data tokenization key token for the tokenized data type instance has not been cached, the database server 706 may send a master tokenization key request 729 to a secure key storage 710 (e.g., HSM, AWS KMS) to retrieve the master tokenization key for the tokenized data type. In one implementation, the master tokenization key request may include data such as a request identifier, a requestor identifier, authentication data, the tokenized data type, and/or the like. In one embodiment, the database server may provide the following example master tokenization key request, substantially in the form of a HTTP(S) POST message including XML-formatted data, as provided below:

POST/master_tokenization_key_request.php HTTP/1.1
Host: www.server.com
Content-Type: Application/XML
Content-Length: 667
<?XML version="1.0" encoding="UTF-8"?>
<master_tokenization_key_request>
<request_identifier>ID_request_12</request_identifier>
<requestor_identifier>ID_detokenization_process_1</requestor_identifier>
<authentication_data>requestor's authentication token</authentication_data>
<tokenized_data_type>Digit</tokenized_data_type>
</master_tokenization_key_request>

The secure key storage 710 may send a master tokenization key response 733 to the database server 706 with the requested master tokenization key. In one implementation, the master tokenization key response may include data such as a response identifier, the requested master tokenization key, and/or the like. In one embodiment, the secure key storage may provide the following example master tokenization key response, substantially in the form of a HTTP(S) POST message including XML-formatted data, as provided below:

POST/master_tokenization_key_response.php HTTP/1.1
Host: www.server.com
Content-Type: Application/XML
Content-Length: 667
<?XML version="1.0" encoding="UTF-8"?>
<master_tokenization_key_response>
<response_identifier>ID_response_12</response_identifier>
<master_tokenization_key>MTK</master_tokenization_key>
</master_tokenization_key_response>

The database server 706 may send a detokenized data retrieval response 737 to the client 702 with the requested plaintext data. In one implementation, the detokenized data retrieval response may include data such as a response identifier, the requested plaintext data, and/or the like. In one embodiment, the database server may provide the following example detokenized data retrieval response, substantially in the form of a HTTP(S) POST message including XML-formatted data, as provided below:

POST/detokenized_data_retrieval_response.php HTTP/1.1
Host: www.server.com
Content-Type: Application/XML
Content-Length: 667
<?XML version="1.0" encoding="UTF-8"?>
<detokenized_data_retrieval_response>
<response_identifier>ID_response_11</response_identifier>
<plaintext_data_value>333557788</plaintext_data_value>
</detokenized_data_retrieval_response>

FIG. 8 shows a logic flow illustrating embodiments of a data detokenization and retrieval (DDR) component for the VDT. In FIG. 8, a detokenized data retrieval request may be obtained at 801. For example, the detokenized data retrieval request may be obtained via a SQL-based Snowflake database command similar to the following:
SELECT userSSN
FROM Users
WHERE userID=ID_user_1;

A requestor associated with the detokenized data retrieval request may be determined at 805. In one embodiment, the detokenized data retrieval request may be obtained as a result of a request from an authenticated user and/or application client to retrieve plaintext data using stored tokenized data. For example, the user may be authenticated via 2FA. In another example, the application client may be authenticated via OAuth and IP whitelisting. In one implementation, the detokenized data retrieval request may be parsed (e.g., using PHP commands) to determine the requestor (e.g., based on the value of the requestor_identifier field).

A determination may be made at 809 whether the requestor is authorized to perform the request. In one embodiment, a SQL-based data access layer (e.g., implemented using Snowflake UDFs and database views) may be used to provide controlled access to tokenized and/or detokenized data. In one implementation, the detokenized data retrieval request may be parsed (e.g., using PHP commands) to determine whether the requestor is authorized to perform the request (e.g., by checking security access based on the value of the authentication_data field). If the requestor is not authorized to perform the request, the request may be denied at 813.

If the requestor is authorized to perform the request, a data type (e.g., Digit) and/or data type instance (e.g., SSN) of a tokenized data value to retrieve may be determined at 817. See FIG. 2 for additional examples of data types and data type instances. In one implementation, the detokenized data retrieval request may be parsed (e.g., using PHP commands) to determine the data type and/or data type instance of the tokenized data value (e.g., based on the values of the tokenized_data_type and/or tokenized_data_type_instance fields). In another implementation, the data type and/or data type instance of the tokenized data value may be determined based on analysis of the SQL-based database command. For example, if the database command retrieves the userSSN field of the Users table, the data type and/or data type instance of the specified table's specified field may be used to determine the data type and/or data type instance of the tokenized data value.

An active data tokenization key token (DTKT) for the data type instance may be determined at 821. For example, the VDT may be configured such that multiple (e.g., two) DTKTs are utilized for each data type instance during tokenization, and the active DTKT is utilized during detokenization. In one implementation, a VDT configuration setting may be checked to determine the active DTKT for the data type instance (e.g., specified using a DTKT identifier).

An active token envelope may be retrieved from a token payload at 825. For example, the VDT may be configured such that multiple (e.g., two) tokenized data value versions (e.g., each in a token envelope associated with a DTKT identifier) of a plaintext data value are stored in a token payload. See FIG. 4 for additional details regarding token payloads. In one implementation, the active token envelope may be determined as the token envelope associated with the active DTKT for the data type instance. Accordingly, a token payload (e.g., SSN of user with identifier ID_user_1) associated with the detokenized data retrieval request may be retrieved (e.g., via SQL-based database commands) from a token data store (e.g., Snowflake cloud data warehouse, a database), and/or the token envelope associated with the active DTKT may be retrieved from the token payload. For example, the active token envelope may be retrieved as follows:

```
Token Payload = [Metadata Token 1] [Metadata Token 2] [Data Token 1] [Data Token 2]
```

```
[DTKT1_Id, DTKT1_sp, DT1_start] [DTKT2_Id, DTKT2_sp, DT2_start] [777224455]
[555880077]
If active DTKT identifier = DTKT1_Id
Active token envelope = [DTKT1_Id, DTKT1_sp, DT1_start] [777224455]
If active DTKT identifier = DTKT2_Id
Active token envelope = [DTKT2_Id, DTKT2_sp, DT2_start] [555880077]
where,
[Metadata Token] = [DTKT_Id, DTKT_sp, DT_start]
[Data Token] = [tokenized data value]
DTKT_Id = identifier of the DTKT associated with envelope
DTKT_sp = DTKT shift position of the associated DTKT
DT_start = location and/or size of the associated [Data Token]
```

A cache may be checked for existence of the active DTKT (e.g., DTKT1) for the data type instance at 829. In one implementation, the cache may be checked for the presence of the identifier (e.g., DTKT1_Id) of the active DTKT for the data type instance.

If it is determined at 833 that the active DTKT for the data type instance is not cached, a master tokenization key (MTK) for the data type may be retrieved from a first secure location at 837. For example, the first secure location may be an HSM, an AWS KMS, a secured database table, and/or the like. In one implementation, the MTK for the data type may be retrieved via a master tokenization key request.

A data tokenization key (DTK) for the data type instance, associated with the active DTKT, may be retrieved from a second secure location at 841. For example, the second secure location may be an HSM, an AWS KMS, a secured database table, and/or the like. In one implementation, the DTK for the data type instance may be retrieved via a SQL-based Snowflake database command similar to the following:

SELECT dataTokenizationKey
    FROM DTKs
    WHERE    associatedDataType="Digit"    AND
        associatedDataTypeInstance="SSN"    AND
        associatedDTKT_Identifier=DTKT1_Id;

A plaintext alphabet for the data type may be determined at 845. In one implementation, the character set associated with the data type may be determined. For example, the character set associated with data type Digit is [0-9]. In another example, the character set associated with data type Alphanumeric is [a-zA-Z0-9].

An MTK shift position for the data type may be calculated at 849. In one embodiment, the MTK shift position specifies the number of characters by which to shift a ciphertext alphabet (e.g., the MTK) during calculation of the DTKT for the data type instance. In various implementations, the MTK shift position for the data type may be determined using either a deterministic token implementation or a randomized token implementation. For example, the MTK shift position for the data type may be calculated using a deterministic token implementation as follows:

```
                MTK shift position calculation (deterministic)

mtk_sp = mod(abs(hash(mtk + dtk)), 2N)
    where,
        mod = the modulo function
        abs = the absolute value function
        hash = a hash function (e.g., Java hashCode( )) that
            generates a numeric hash code of a string
        N = length of the mtk
```

In another example, the MTK shift position for the data type that was calculated during tokenization of the tokenized data value using a randomized token implementation may be determined from the active token envelope (e.g., the active token envelope may be parsed to determine the value of the mtk_sp stored in the metadata token).

The active DTKT for the data type instance may be determined at 853. In one implementation, the active DTKT for the data type instance may be retrieved from cache using its identifier. In another implementation, the active DTKT for the data type instance may be calculated (e.g., via Snowflake UDFs). For example, the active DTKT for the data type instance may be calculated as follows:

```
                        DTKT calculation dtkt = T(dtk, pta, mtk, mtk_sp) shift(mtk, mtk_sp)))
    dtkt = reverse(translate(dtk, pta,
    where,
    pta = plaintext alphabet for the data type
    T = the tokenize function (e.g., that performs a shifted substitution cipher)
    reverse = a function that reverses a string (e.g., "abc" to "cba")
    translate = a function that generates a substitution cipher of plaintext dtk
        using plaintext alphabet pta and a shifted ciphertext alphabet generated by
        the shift function by translating string characters of dtk from pta charac-
        ters
        to characters of the shifted ciphertext alphabet
    shift = a function that generates a shifted ciphertext alphabet by shifting
        mtk by mtk_sp characters using a right-to-left circular shift (e.g., if
        mtk_sp < N then shift mtk from right to left mtk_sp characters, and if
        N <= mtk_sp < 2N then shift reverse(mtk) right to left mtk_sp
        characters, where N = length of mtk)
```

A determination may be made at 857 whether to detokenize the entire tokenized data value. In some embodiments, instead of detokenizing the entire tokenized data value, a subset of the tokenized data value may be detokenized. For example, instead of detokenizing the entire date of birth field, the day within the date of birth may be detokenized (e.g., the other portions of the date of birth field may be stored in plaintext).

If a subset of the plaintext data value should be detokenized, the subset of the tokenized data value to detokenize may be determined at 861. In one implementation, the tokenized data value may specify a subset of the tokenized data value to be tokenized (e.g., via special characters marking the portion to be detokenized). In another implementation, specific fields may be configured (e.g., via Snowflake UDFs) to detokenize a specified subset of the tokenized data value.

A DTKT shift position for the tokenized data value may be determined from the active token envelope at 865. In one embodiment, the DTKT shift position for the tokenized data value specifies the number of characters by which to shift a ciphertext alphabet (e.g., the DTKT) during calculation of a plaintext data value of the tokenized data value.

A plaintext data value of the tokenized data value may be calculated at 873. In one implementation, the plaintext data value of the tokenized data value stored in the active token envelope may be calculated using the active DTKT for the data type instance and the DTKT shift position (e.g., via Snowflake UDFs). For example, the plaintext data value of the tokenized data value may be calculated as follows:

---
Plaintext data value calculation
---
plaintext = DT(token, pta, dtkt, dtkt_sp)
plaintext = reverse(translate(token, shift(dtkt, dtkt_sp), pta))
where,
token = the tokenized data value
pta = plaintext alphabet for the data type instance
DT = the detokenize function (e.g., that performs the reverse of the shifted substitution cipher)
reverse = a function that reverses a string (e.g., "abc" to "cba")
translate = a function that generates plaintext from substitution cipher token, using a shifted ciphertext alphabet generated by the shift function and plaintext alphabet pta, by translating string characters of token from characters of the shifted ciphertext alphabet to pta characters
shift = a function that generates a shifted ciphertext alphabet by shifting dtkt by dtkt_sp characters using a right-to-left circular shift (e.g., if dtkt_sp < N then shift dtkt from right to left dtkt_sp characters, and if N <= dtkt_sp < 2N then shift reverse(dtkt) right to left dtkt_sp characters, where N = length of dtkt)
---

The plaintext data value may be provided to the requestor at 881. In one implementation, the plaintext data value (e.g., 333557788) may be provided to the requestor via a detokenized data retrieval response.

FIG. 9 shows implementation case(s) for the VDT. In FIG. 9, exemplary performance benchmarks comparing database performance with and without tokenization and detokenization, and demonstrating VDT efficiency are illustrated. An exemplary VDT implementation using Snowflake was used to evaluate the efficiency of tokenization and detokenization. The test was performed using a sample data set from a table (TABLE_A) with approximately 60 million records and a string field (COL_A) with varying length values and with an average length of 26 characters. The performance test used SQL UDFs for the tokenization, detokenization, and token access functions using an alphanumeric charset. A large Snowflake Virtual Warehouse was used to execute the tests.

As shown at 901, before running the tokenization tests, a baseline test was performed by copying COL_A from TABLE_A to a new column (COL_B).

As shown at 905, the tokenization test was performed by tokenizing COL_A and copying to COL_B in TABLE_A.

As shown at 910, the detokenization test was performed by detokenizing COL_B and copying to a new column (COL_C) in TABLE_A.

The average difference in elapsed time between the results of the baseline test (28.65 secs) and the tokenization test (56.27 secs) was 27.62 seconds. The net performance of the tokenization on approximately 60 million records was 2,171,834 records/sec.

The average difference in elapsed time between the results of the baseline test (28.65 secs) and the detokenization test (32.48 secs) was 3.83 seconds. The net performance of the detokenization on approximately 60 million records was 15,662,155 records/sec.

FIG. 10 shows an architecture for the VDT. In FIG. 10, an embodiment of how tokenization, detokenization, and token access functions may be utilized to handle tokenization and detokenization of an SSN field is illustrated. The Tokenize function 1001 tokenizes a plaintext value of the SSN field (e.g., 333557788) using DTK1 to create a first tokenized value (e.g., 777224455) stored in Token 1 and DTK2 to create a second tokenized value (e.g., 555880077) stored in Token 2. The Get Token function 1005 returns Token 1 (e.g., the active token envelope), and the Detokenize function 1010 detokenizes Token 1 to get the plaintext value (e.g., 333557788). The token metadata has been omitted for clarity.

In various implementations, additional functions may be utilized to wrap these access function to implement isolation, abstraction and additional functionality. For example, additional functions may be utilized to tokenize a portion of a field, implement security policies, and/or the like.

FIG. 11 shows an architecture for the VDT. In FIG. 11, an embodiment of how multiple token envelopes may be utilized to facilitate token retokenization is illustrated. For example, by using two versions of the token envelope stored in the token payload, retokenization may be performed with minimal impact on producers and consumers of the token data. In one implementation, the following may be performed to retokenize the SSN field discussed with regard to FIG. 10 to rotate from using DTK1 to using DTK3.

At 1101, the Get Token function may be updated to return Token 2 that was tokenized with DTKT2. At 1105, the Detokenize function may be updated to use DTKT2 to detokenize Token 2 (e.g., the new active token envelope). Thus, the consumers of the token data are switched from using Token 1 and DTKT1 to using Token 2 and DTKT2 for detokenization without any interruption.

At 1110, the Tokenize function may be updated to use DTKT3 instead of DTKT1 to tokenize Token 1. For example, the Tokenize function tokenizes the plaintext value of the SSN field (e.g., 333557788) using DTK3 to create a third tokenized value (e.g., 222550066) stored in Token 1. Thus, the producers of the token data are switched from using DTKT1 to tokenize Token 1 to using DTKT3 to tokenize Token 1, and continue to tokenize Token 2 using DTKT2, without any interruption.

At 1115, the updated Detokenize and Tokenize functions may be used to implement a Retokenization function that updates records that store tokenized values in Token 1 created using DTKT1 to store tokenized values in Token 1 created using DTKT3. For example, the Retokenization function may detokenize Token 2 to obtain a plaintext value and tokenize the obtained plaintext value to update Token 1 to store a tokenized value created using DTKT3. It is to be understood that the Retokenization function does not have to execute immediately and may be scheduled for a convenient future time (e.g., outside of active hours of database usage).

FIG. 12 shows a datagraph illustrating data flow(s) for the VDT. In FIG. 12, dashed lines indicate data flow elements that may be more likely to be optional. In FIG. 12, a client 1202 (e.g., of an administrative user) may send a tokenized data retokenization request 1221 to a database server 1206 to facilitate retokenizing stored tokenized data. For example, the client may be a desktop, a laptop, a tablet, a smartphone, a smartwatch, and/or the like that is executing a client application. In one implementation, the tokenized data retokenization request may include data such as a request identifier, a requestor identifier, authentication data, identifier of a data tokenization key (DTK) to replace, and/or the like. In one embodiment, the client may provide the following example tokenized data retokenization request, substantially in the form of a HTTP(S) POST message including XML-formatted data, as provided below:

POST/tokenized_data_retokenization_request.php
HTTP/1.1
　Host: www.server.com
　Content-Type: Application/XML
　Content-Length: 667
　<?XML version="1.0" encoding="UTF-8"?>
　<tokenized_data_retokenization_request>
　<request_identifier>ID_request_21</request_identifier>
　<requestor_identifier>ID_admin_user_1</requestor_identifier>
　<authentication_data>requestor's authentication token</authentication_data>
　<DTK_to_replace>DTK1_Id</DTK_to_replace>
　</tokenized_data_retokenization_request>

Alternatively, a schedule may be set up to trigger retokenizing of stored tokenized data automatically (e.g., periodically) at specified times (e.g., daily, weekly, monthly).

A tokenized data retokenization (TDR) component 1225 may retokenize the specified (e.g., via the tokenized data retokenization request, via the schedule) stored tokenized data. See FIG. 13 for additional details regarding the TDR component.

The database server 1206 may send a master tokenization key request 1229 to a secure key storage 1210 (e.g., HSM, AWS KMS) to retrieve the master tokenization key for the tokenized data type. In one implementation, the master tokenization key request may include data such as a request identifier, a requestor identifier, authentication data, the tokenized data type, and/or the like. In one embodiment, the database server may provide the following example master tokenization key request, substantially in the form of a HTTP(S) POST message including XML-formatted data, as provided below:

POST/master_tokenization_key_request.php HTTP/1.1
　Host: www.server.com
　Content-Type: Application/XML
　Content-Length: 667
　<?XML version="1.0" encoding="UTF-8"?>
　<master_tokenization_key_request>
　<request_identifier>ID_request_22</request_identifier>
　<requestor_identifier>ID_retokenization_process_1</requestor_identifier>
　<authentication_data>requestor's authentication token</authentication_data>
　<tokenized_data_type>Digit</tokenized_data_type>
　</master_tokenization_key_request>

The secure key storage 1210 may send a master tokenization key response 1233 to the database server 1206 with the requested master tokenization key. In one implementation, the master tokenization key response may include data such as a response identifier, the requested master tokenization key, and/or the like. In one embodiment, the secure key storage may provide the following example master tokenization key response, substantially in the form of a HTTP(S) POST message including XML-formatted data, as provided below:

POST/master_tokenization_key_response.php HTTP/1.1
　Host: www.server.com
　Content-Type: Application/XML
　Content-Length: 667
　<?XML version="1.0" encoding="UTF-8"?>
　<master_tokenization_key_response>
　<response_identifier>ID_response_22</response_identifier>
　<master_tokenization_key>MTK</master_tokenization_key>
　</master_tokenization_key_response>

If the tokenized data retokenization request was received, the database server 1206 may send a tokenized data retokenization response 1237 to the client 1202 to inform the administrative user whether the tokenized data was retokenized successfully. In one implementation, the tokenized data retokenization response may include data such as a response identifier, a status, and/or the like. In one embodiment, the database server may provide the following example tokenized data retokenization response, substantially in the form of a HTTP(S) POST message including XML-formatted data, as provided below:

POST/tokenized_data_retokenization_response.php
　HTTP/1.1
　Host: www.server.com
　Content-Type: Application/XML
　Content-Length: 667
　<?XML version="1.0" encoding="UTF-8"?>
　<tokenized_data_retokenization_response>
　<response_identifier>ID_response_21</response_identifier>
　<status>OK</status>
　</tokenized_data_retokenization_response>

FIG. 13 shows a logic flow illustrating embodiments of a tokenized data retokenization (TDR) component for the VDT. In FIG. 13, a tokenized data retokenization request may be obtained at 1301. For example, the tokenized data retokenization request may be obtained as a result of a request from an administrative user to retokenize stored tokenized data. In another example, the tokenized data retokenization request may be triggered based on a schedule that specifies when to retokenize stored tokenized data.

An existing data tokenization key (DTK) to replace may be determined at 1305. For example, the DTK may be replaced on request (e.g., from the administrative user), after a predetermined time period (e.g., daily, weekly, monthly), due to a security compromise, due to a key corruption, and/or the like. In one implementation, the tokenized data retokenization request may be parsed (e.g., using PHP commands) to determine the identifier of the existing DTK to replace (e.g., based on the value of the DTK_to_replace field).

A data type and/or data type instance associated with the existing DTK may be determined at 1309. In one implementation, the data type and/or data type instance associated with the existing DTK to replace may be determined based on the identifier of the DTK. For example, the data type and/or data type instance associated with the existing DTK to replace may be determined via a SQL-based Snowflake database command similar to the following:

SELECT associatedDataType, associatedDataTypeInstance
　FROM DTKs
　WHERE dataTokenizationKeyID=DTK1_Id;

A new DTK for the data type instance may be generated at 1313. In one embodiment, the new DTK may be generated using a Deterministic Random Bit Generator (DRBG) that conforms to NIST SP 800-90A, and has been seeded with at least two separate cryptographically secure sources of entropy that have been combined in a cryptographically secure manner (e.g., SHA256[UnguessableFactor1+UnguessableFactor2]). In one implementation, the length of the new DTK may be set to be the same as the alphabet size associated with the data type (e.g., for [a-zA-Z0-9] key length=62 bytes).

The new DTK may be stored in the second secure location at 1317. In various implementations, the new DTK may be stored in an HSM, in an AWS KMS, in a secured database table, and/or the like. For example, the new DTK may be stored in the second secure location via a SQL-based Snowflake database command similar to the following:
INSERT INTO DTKs (dataTokenizationKeyID, dataTokenizationKey, associatedDataType, associatedDataTypeInstance)
VALUES (DTK3_Id, new DTK, "Digit", "SSN");

A master tokenization key (MTK) for the data type may be retrieved from the first secure location at 1321. For example, the first secure location may be an HSM, an AWS KMS, a secured database table, and/or the like. In one implementation, the MTK for the data type may be retrieved via a master tokenization key request.

A plaintext alphabet for the data type may be determined at 1325. In one implementation, the character set associated with the data type may be determined. For example, the character set associated with data type Digit is [0-9]. In another example, the character set associated with data type Alphanumeric is [a-zA-Z0-9].

An MTK shift position for the data type may be calculated at 1329. In one embodiment, the MTK shift position specifies the number of characters by which to shift a ciphertext alphabet (e.g., the MTK) during calculation of a DTKT for the data type instance. In various implementations, the MTK shift position for the data type may be determined using either a deterministic token implementation or a randomized token implementation. For example, the MTK shift position for the data type may be calculated using a deterministic token implementation as follows:

---
MTK shift position calculation (deterministic)
---
mtk_sp = mod(abs(hash(mtk + dtk)), 2N)
where,
mod = the modulo function
abs = the absolute value function
hash = a hash function (e.g., Java hashCode( )) that generates a numeric hash code of a string
N = length of the mtk
---

In another example, the MTK shift position for the data type may be calculated using a randomized token implementation as follows:

---
MTK shift position calculation (randomized)
---
mtk_sp = mod(abs(random(0:2N-1)), 2N)
where,
mod = the modulo function
abs = the absolute value function
random = random number generator function of numbers between minimum and maximum values
N = length of the mtk
---

A new data tokenization key token (DTKT) for the data type instance may be calculated at 1333. In one implementation, the new DTKT for the data type instance may be calculated (e.g., via Snowflake UDFs) based on the new DTK. For example, the new DTKT for the data type instance may be calculated as follows:

---
DTKT calculation
---
dtkt = T(dtk, pta, mtk, mtk_sp)
dtkt = reverse(translate(dtk, pta, shift(mtk, mtk_sp)))
where,
pta = plaintext alphabet for the data type
T = the tokenize function (e.g., that performs a shifted substitution cipher)
reverse = a function that reverses a string (e.g., "abc" to "cba")

---
DTKT calculation
---
translate = a function that generates a substitution cipher of plaintext dtk using plaintext alphabet pta and a shifted ciphertext alphabet generated by the shift function by translating string characters of dtk from pta characters to characters of the shifted ciphertext alphabet
shift = a function that generates a shifted ciphertext alphabet by shifting mtk by mtk_sp characters using a right-to-left circular shift (e.g., if mtk_sp < N then shift mtk from right to left mtk_sp characters, and if N <= mtk_sp < 2N then shift reverse(mtk) right to left mtk_sp characters, where N = length of mtk)
---

The new DTKT (e.g., with identifier DTKT3_Id) may be stored in cache at 1337. In one implementation, the cache may store the new DTKT and/or may index the new DTKT by its identifier.

The active DTKT for the data type instance may be updated to an alternative DTKT at 1341. For example, the active DTKT for the data type instance may be used for detokenizing. In one implementation, if two DTKTs are utilized for each data type instance, the active DTKT for the data type instance may be updated (e.g., via a VDT configuration setting) from the existing DTKT (e.g., with identifier DTKT1_Id) to a second DTKT (e.g., with identifier DTKT2_Id).

The existing DTKT (e.g., with identifier DTKT1_Id) may be replaced with the new DTKT (e.g., with identifier DTKT3_Id) in a set of DTKTs used for the data type instance at 1345. For example, the set of DTKTs may specify DTKTs that are used for tokenizing data values of the data type instance. In one implementation, a VDT configuration setting may be updated to modify the set of DTKTs used for the data type instance.

The existing DTKT (e.g., with identifier DTKT1_Id) may be deleted from cache at 1349. In one implementation, the existing DTKT may be deleted from the cache using its identifier.

A determination may be made at 1353 whether there remain records (e.g., stored database records) using the existing DTKT to update. In one implementation, each of the records using the existing DTKT (e.g., with identifier DTKT1_Id) may be updated. If there remain records using the existing DTKT to update, the next record may be selected at 1357.

A plaintext data value of the selected record may be retrieved at 1361. In one implementation, the plaintext data value of the selected record may be retrieved (e.g., using the active DTKT (e.g., with identifier DTKT2_Id) used for the data type instance) as discussed with regard to the DDR component (e.g., using the DDR component).

An updated tokenized data value of the selected record may be stored at 1365. In one implementation, the updated tokenized data value of the selected record may be determined (e.g., using the set of DTKTs (e.g., with identifiers DTKT2_Id, DTKT3_Id) used for the data type instance) as discussed with regard to the DTS component (e.g., using the DTS component).

The existing DTK (e.g., with identifier DTK1_Id) may be deleted from the second secure location at 1369. In one implementation, the existing DTK to replace may be deleted from the second secure location using its identifier.

VDT Controller

FIG. 14 shows a block diagram illustrating embodiments of a VDT controller. In this embodiment, the VDT controller 1401 may serve to aggregate, process, store, search, serve, identify, instruct, generate, match, and/or facilitate interactions with a computer through information security technologies, and/or other related data.

Users, which may be people and/or other systems, may engage information technology systems (e.g., computers) to facilitate information processing. In turn, computers employ processors to process information; such processors 1403 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the VDT controller 1401 may be connected to and/or communicate with entities such as, but not limited to: one or more users from peripheral devices 1412 (e.g., user input devices 1411); an optional cryptographic processor device 1428; and/or a communications network 1413.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The VDT controller 1401 may be based on computer systems that may comprise, but are not limited to, components such as: a computer systemization 1402 connected to memory 1429.

Computer Systemization

A computer systemization 1402 may comprise a clock 1430, central processing unit ("CPU(s)" and/or "processor(s)" (these terms are used interchangeable throughout the disclosure unless noted to the contrary)) 1403, a memory 1429 (e.g., a read only memory (ROM) 1406, a random access memory (RAM) 1405, etc.), and/or an interface bus 1407, and most frequently, although not necessarily, are all interconnected and/or communicating through a system bus 1404 on one or more (mother)board(s) 1402 having conductive and/or otherwise transportive circuit pathways through which instructions (e.g., binary encoded signals) may travel to effectuate communications, operations, storage, etc. The computer systemization may be connected to a power source 1486; e.g., optionally the power source may be internal. Optionally, a cryptographic processor 1426 may be connected to the system bus. In another embodiment, the cryptographic processor, transceivers (e.g., ICs) 1474, and/or sensor array (e.g., accelerometer, altimeter, ambient light, barometer, global positioning system (GPS) (thereby allowing VDT controller to determine its location), gyroscope, magnetometer, pedometer, proximity, ultra-violet sensor, etc.) 1473 may be connected as either internal and/or external peripheral devices 1412 via the interface bus I/O 1408 (not pictured) and/or directly via the interface bus 1407. In turn, the transceivers may be connected to antenna(s) 1475, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), i.e., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the VDT controller and beyond through various interfaces. Should processing requirements dictate a greater amount speed and/or capacity, distributed processors (e.g., see Distributed VDT below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the VDT may be achieved by implementing a microcontroller such as CAST's® R8051XC2 microcontroller; Intel's® MCS 51 (i.e., 8051 microcontroller); and/or the like. Also, to implement certain features of the VDT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the VDT component collection (distributed or otherwise) and/or features may be implemented via the microprocessor and/or via embedded components; e.g., via ASIC, coprocessor, DSP, FPGA, and/or the like. Alternately, some implementations of the VDT may be implemented with embedded components that are configured and used to achieve a variety of features or signal processing.

Depending on the particular implementation, the embedded components may include software solutions, hardware solutions, and/or some combination of both hardware/software solutions. For example, VDT features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the VDT features. A hierarchy of programmable interconnects allow logic blocks to be interconnected as needed by the VDT system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the VDT may be developed on FPGAs and then migrated into a fixed version that more resembles ASIC implementations. Alternate or coordinating implementations may migrate VDT controller features to a final ASIC instead of or in addition to FPGAs. Depending on the implementation all of the aforementioned embedded components and microprocessors may be considered the "CPU" and/or "processor" for the VDT.

Power Source

The power source 1486 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1486 is connected to at least one of the interconnected subsequent components of the VDT thereby providing an electric current to all subsequent components. In one example, the power source 1486 is connected to the system bus component 1404. In an alternative embodiment, an outside power source 1486 is provided through a connection across the I/O 1408 interface. For example, a USB and/or IEEE 1394 connection carries both data and power across the connection and is therefore a suitable source of power.

Interface Adapters

Interface bus(ses) 1407 may accept, connect, and/or communicate to a number of interface adapters, variously although not necessarily in the form of adapter cards, such as but not limited to: input output interfaces (I/O) 1408, storage interfaces 1409, network interfaces 1410, and/or the like. Optionally, cryptographic processor interfaces 1427 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1409 may accept, communicate, and/or connect to a number of storage devices such as, but not limited to: storage devices 1414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1410 may accept, communicate, and/or connect to a communications network 1413. Through a communications network 1413, the VDT controller is accessible through remote clients 1433b (e.g., computers with web browsers) by users 1433a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed VDT below), architectures may similarly be employed to pool, load balance, and/or otherwise decrease/increase the communicative bandwidth required by the VDT controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1410 may be used to engage with various communications network types 1413. For example, multiple network interfaces may be employed to allow for the communication over broadcast, multicast, and/or unicast networks.

Input Output interfaces (I/O) 1408 may accept, communicate, and/or connect to user, peripheral devices 1412 (e.g., input devices 1411), cryptographic processor devices 1428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1412 may be connected and/or communicate to I/O and/or other facilities of the like such as network interfaces, storage interfaces, directly to the interface bus, system bus, the CPU, and/or the like. Peripheral devices may be external, internal and/or part of the VDT controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1411 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the VDT controller may be embodied as an embedded, dedicated, and/or monitor-less (i.e., headless) device, and access may be provided over a network interface connection.

Cryptographic units such as, but not limited to, microcontrollers, processors 1426, interfaces 1427, and/or devices 1428 may be attached, and/or communicate with the VDT controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1429. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the VDT controller and/or a computer systemization may employ various forms of memory 1429. For example, a computer systemization may be configured to have the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1429 will include ROM 1406, RAM 1405, and a storage device 1414. A storage device 1414 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally requires and makes use of memory.

Component Collection

The memory 1429 may contain a collection of program and/or database components and/or data such as, but not limited to: operating system component(s) 1415 (operating system); information server component(s) 1416 (information server); user interface component(s) 1417 (user interface); Web browser component(s) 1418 (Web browser); database(s) 1419; mail server component(s) 1421; mail client component(s) 1422; cryptographic server component(s) 1420 (cryptographic server); the VDT component(s) 1435 (e.g., which may include DTS, DDR, TDR 1441-1443, and/or the like components); and/or the like (i.e., collectively a component collection). These components may be stored and accessed from the storage devices and/or from storage devices accessible through an interface bus. Although unconventional program components such as those in the component collection may be stored in a local storage device 1414, they may also be loaded and/or stored in memory such as: peripheral devices, RAM, remote storage facilities through a communications network, ROM, various forms of memory, and/or the like.

Operating System

The operating system component 1415 is an executable program component facilitating the operation of the VDT controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the VDT controller to communicate with other entities through a communications network 1413. Various communication protocols may be used by the VDT controller as a subcarrier transport mechanism for interaction, such as, but not limited to: multicast, TCP/IP, UDP, unicast, and/or the like.

Information Server

An information server component 1416 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the VDT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the VDT database 1419, operating systems, other program components, user interfaces, Web browsers, and/or the like.

Access to the VDT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VDT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the VDT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1417 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1418 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the VDT enabled nodes. The combined application may be nugatory on systems employing Web browsers.

Mail Server

A mail server component 1421 is a stored program component that is executed by a CPU 1403. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the VDT. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the VDT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1422 is a stored program component that is executed by a CPU 1403. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1420 is a stored program component that is executed by a CPU 1403, cryptographic processor 1426, cryptographic processor interface 1427, cryptographic processor device 1428, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the VDT may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the VDT component to engage in secure transactions if so desired. The cryptographic component facilitates the secure accessing of resources on the VDT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The VDT Database

The VDT database component 1419 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the VDT database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the VDT database is implemented as a data-structure, the use of the VDT database 1419 may be integrated into another component such as the VDT component 1435. Also, the database may be implemented as a mix of data structures, objects, and relational structures. Databases may be consolidated and/or distributed in countless variations (e.g., see Distributed VDT below). Portions of databases, e.g., tables, may be exported and/or imported and thus decentralized and/or integrated.

In one embodiment, the database component 1419 includes several tables 1419*a-k:*

An accounts table 1419*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1419*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a VDT);

An devices table 1419*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1419*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1419*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1419*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1419*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1419*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1419i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An MTKs table 1419j includes fields such as, but not limited to: masterTokenizationKeyID, masterTokenizationKey, associatedDataType, and/or the like;

A DTKs table 1419k includes fields such as, but not limited to: dataTokenizationKeyID, dataTokenizationKey, as sociatedDataType, as sociatedDataTypeInstance, associatedDTKT_Identifier, and/or the like.

In one embodiment, the VDT database may interact with other database systems. For example, employing a distributed database system, queries and data access by search VDT component may treat the combination of the VDT database, an integrated data security layer database as a single database entity (e.g., see Distributed VDT below).

In one embodiment, user programs may contain various user interface primitives, which may serve to update the VDT. Also, various accounts may require custom database tables depending upon the environments and the types of clients the VDT may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1419a-k. The VDT may be configured to keep track of various settings, inputs, and parameters via database controllers.

The VDT database may communicate to and/or with other components in a component collection, including itself, and/or facilities of the like. Most frequently, the VDT database communicates with the VDT component, other program components, and/or the like. The database may contain, retain, and provide information regarding other nodes and data.

The VDTs

The VDT component 1435 is a stored program component that is executed by a CPU. In one embodiment, the VDT component incorporates any and/or all combinations of the aspects of the VDT that was discussed in the previous figures. As such, the VDT affects accessing, obtaining and the provision of information, services, transactions, and/or the like across various communications networks. The features and embodiments of the VDT discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the VDT's features and facilities, and in many cases reduce the costs, energy consumption/requirements, and extend the life of VDT's underlying infrastructure; this has the added benefit of making the VDT more reliable. Similarly, many of the features and mechanisms are designed to be easier for users to use and access, thereby broadening the audience that may enjoy/employ and exploit the feature sets of the VDT; such ease of use also helps to increase the reliability of the VDT. In addition, the feature sets include heightened security as noted via the Cryptographic components 1420, 1426, 1428 and throughout, making access to the features and data more reliable and secure The VDT transforms tokenized data storage request, detokenized data retrieval request, tokenized data retokenization request inputs, via VDT components (e.g., DTS, DDR, TDR), into tokenized data storage response, detokenized data retrieval response, tokenized data retokenization response outputs.

The VDT component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the VDT server employs a cryptographic server to encrypt and decrypt communications. The VDT component may communicate to and/or with other components in a component collection, including itself, and/or facilities of the like. Most frequently, the VDT component communicates with the VDT database, operating systems, other program components, and/or the like. The VDT may contain, communicate, generate, obtain, and/or provide program component, system, user, and/or data communications, requests, and/or responses.

Distributed VDTs

The structure and/or operation of any of the VDT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the VDT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for VDT controller and/or VDT component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the VDT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server mysql_select("CLIENT_DB.SQL"); // select database to append
mysql_query("INSERT INTO UserTable (transmission)
```

VALUES ($data)"); // add data to UserTable table in a CLIENT database mysql_close("CLIENT_DB. SQL"); // close connection to database
?>

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/ index.jsp?topic=/com.ibm.IBMDI.doc/ referenceguide295.htm and other parser implementations:

http://publib.boulder.ibm.com/infocenter/tivihelp/v2r1/ index.jsp?topic=/com.ibm.IBMDI.doc/ referenceguide259.htm all of which are hereby expressly incorporated by reference.

Additional embodiments may include:

1. A vaultless data tokenization apparatus, comprising:
a memory;
a component collection in the memory;
a processor disposed in communication with the memory and configured to issue a plurality of processor-executable instructions from the component collection, the processor-executable instructions configured to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

2. The apparatus of embodiment 1, further, comprising:
the processor-executable instructions configured to:
store, via at least one processor, the first token envelope datastructure in a database.

3. The apparatus of embodiment 1, further, comprising:
the tokenized data storage request datastructure is configured as a SQL-based database command.

4. The apparatus of embodiment 1, further, comprising:
the data type and the data type instance are configured to be determined based on a definition of a database field associated with the plaintext data value.

5. The apparatus of embodiment 1, further, comprising:
the data type is configured to be defined by a character set.

6. The apparatus of embodiment 5, further, comprising:
the data type instance is configured as one of a plurality of data type instances associated with the character set.

7. The apparatus of embodiment 1, further, comprising:
the instructions to determine the first data tokenization key token are configured to comprise instructions to retrieve the first data tokenization key token from a cache.

8. The apparatus of embodiment 1, further, comprising:
the instructions to determine the first data tokenization key token are configured to comprise instructions to:
retrieve, via at least one processor, the first cryptographic key from a first secure location;
retrieve, via at least one processor, the second cryptographic key from a second secure location;
calculate, via at least one processor, a first master shift position for the first cryptographic key, the first master shift position is configured to be calculated by applying the hash function to the combination of the first cryptographic key and the second cryptographic key;
determine, via at least one processor, the plaintext alphabet associated with the data type; and
generate, via at least one processor, the first data tokenization key token by translating the second cryptographic key from the plaintext alphabet to the shifted ciphertext master alphabet generated by shifting the first cryptographic key using the first master shift position.

9. The apparatus of embodiment 8, further, comprising:
the first secure location is configured as one of a hardware security module, a key management service, a secured database table.

10. The apparatus of embodiment 8, further, comprising:
the first secure location and the second secure location are configured as the same location.

11. The apparatus of embodiment 1, further, comprising:
the processor-executable instructions configured to:
determine, via at least one processor, a subset of the plaintext data value to tokenize,
the first data shift position is configured to be calculated by applying the hash function to the combination of the first data tokenization key token and the subset of the plaintext data value, and
the first tokenized data value is configured to be generated by translating the subset of the plaintext data value from the plaintext alphabet to the first shifted ciphertext data alphabet.

12. The apparatus of embodiment 1, further, comprising:
the processor-executable instructions configured to:
determine, via at least one processor, a second data tokenization key token for the data type instance, the data type instance is configured to be associated with a third cryptographic key, the second data tokenization key token is configured to be generated by translating the third cryptographic key from a plaintext alphabet associated with the data type to a second shifted ciphertext master alphabet generated using the first cryptographic key and the third cryptographic key;
calculate, via at least one processor, a second data shift position for the second data tokenization key token, the second data shift position is configured to be calculated by applying the hash function to the combination of the second data tokenization key token and the plaintext data value;
generate, via at least one processor, a second tokenized data value by translating the plaintext data value from the plaintext alphabet to a second shifted ciphertext data alphabet generated by shifting the second data tokenization key token using the second data shift position;
generate, via at least one processor, a second token envelope datastructure, the second token envelope datastructure configured to comprise the second tokenized data value and the second data shift position; and
store, via at least one processor, a token payload datastructure, the token payload datastructure configured to comprise data from the first token envelope datastructure and from the second token envelope datastructure.

13. The apparatus of embodiment 12, further, comprising:
the processor-executable instructions configured to:
obtain, via at least one processor, a tokenized data retokenization request datastructure, the tokenized data retokenization request datastructure configured to specify the data type instance;
update, via at least one processor, an active data tokenization key token for the data type instance to the second data tokenization key token;
generate, via at least one processor, a third data tokenization key token for the data type instance;
replace, via at least one processor, the first data tokenization key token with the third data tokenization key token in a set of data tokenization key tokens associated with the data type instance;
calculate, via at least one processor, the plaintext data value using the active data tokenization key token for the data type instance and the second tokenized data value from the token payload datastructure;
generate, via at least one processor, a third tokenized data value of the plaintext data value by translating the plaintext data value from the plaintext alphabet to a third shifted ciphertext data alphabet generated by shifting the third data tokenization key token using a third data shift position;
generate, via at least one processor, a third token envelope datastructure, the third token envelope datastructure configured to comprise the third tokenized data value and the third data shift position; and
store, via at least one processor, an updated token payload datastructure, the updated token payload datastructure configured to comprise data from the second token envelope datastructure and from the third token envelope datastructure.

14. The apparatus of embodiment 1, further, comprising:
the processor-executable instructions configured to:
obtain, via at least one processor, a detokenized data retrieval request datastructure, the detokenized data retrieval request datastructure configured to specify a field that stores the first token envelope datastructure;
determine, via at least one processor, an active data tokenization key token for the data type instance, the active data tokenization key token is configured to be the first data tokenization key token;
retrieve, via at least one processor, the first data shift position from the first token envelope datastructure;
retrieve, via at least one processor, the first tokenized data value from the first token envelope datastructure; and
calculate, via at least one processor, the plaintext data value by translating the first tokenized data value from the first shifted ciphertext data alphabet generated by shifting the active data tokenization key token using the first data shift position to the plaintext alphabet.

15. The apparatus of embodiment 14, further, comprising:
the active data tokenization key token for the data type instance is configured to be one of a plurality of data tokenization key tokens associated with the data type instance.

16. A processor-readable vaultless data tokenization non-transient medium, comprising processor-executable instructions configured to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

17. The medium of embodiment 16, further, comprising:
the processor-executable instructions configured to:
store, via at least one processor, the first token envelope datastructure in a database.

18. The medium of embodiment 16, further, comprising:
the tokenized data storage request datastructure is configured as a SQL-based database command.

19. The medium of embodiment 16, further, comprising:
the data type and the data type instance are configured to be determined based on a definition of a database field associated with the plaintext data value.

20. The medium of embodiment 16, further, comprising:
the data type is configured to be defined by a character set.

21. The medium of embodiment 20, further, comprising:
the data type instance is configured as one of a plurality of data type instances associated with the character set.

22. The medium of embodiment 16, further, comprising:
the instructions to determine the first data tokenization key token are configured to comprise instructions to retrieve the first data tokenization key token from a cache.

23. The medium of embodiment 16, further, comprising:
the instructions to determine the first data tokenization key token are configured to comprise instructions to:
  retrieve, via at least one processor, the first cryptographic key from a first secure location;
  retrieve, via at least one processor, the second cryptographic key from a second secure location;
  calculate, via at least one processor, a first master shift position for the first cryptographic key, the first master shift position is configured to be calculated by applying the hash function to the combination of the first cryptographic key and the second cryptographic key;
  determine, via at least one processor, the plaintext alphabet associated with the data type; and
  generate, via at least one processor, the first data tokenization key token by translating the second cryptographic key from the plaintext alphabet to the shifted ciphertext master alphabet generated by shifting the first cryptographic key using the first master shift position.

24. The medium of embodiment 23, further, comprising:
the first secure location is configured as one of a hardware security module, a key management service, a secured database table.

25. The medium of embodiment 23, further, comprising:
the first secure location and the second secure location are configured as the same location.

26. The medium of embodiment 16, further, comprising:
the processor-executable instructions configured to:
  determine, via at least one processor, a subset of the plaintext data value to tokenize,
  the first data shift position is configured to be calculated by applying the hash function to the combination of the first data tokenization key token and the subset of the plaintext data value, and
  the first tokenized data value is configured to be generated by translating the subset of the plaintext data value from the plaintext alphabet to the first shifted ciphertext data alphabet.

27. The medium of embodiment 16, further, comprising:
the processor-executable instructions configured to:
  determine, via at least one processor, a second data tokenization key token for the data type instance, the data type instance is configured to be associated with a third cryptographic key, the second data tokenization key token is configured to be generated by translating the third cryptographic key from a plaintext alphabet associated with the data type to a second shifted ciphertext master alphabet generated using the first cryptographic key and the third cryptographic key;
  calculate, via at least one processor, a second data shift position for the second data tokenization key token, the second data shift position is configured to be calculated by applying the hash function to the combination of the second data tokenization key token and the plaintext data value;
  generate, via at least one processor, a second tokenized data value by translating the plaintext data value from the plaintext alphabet to a second shifted ciphertext data alphabet generated by shifting the second data tokenization key token using the second data shift position;
  generate, via at least one processor, a second token envelope datastructure, the second token envelope datastructure configured to comprise the second tokenized data value and the second data shift position; and
  store, via at least one processor, a token payload datastructure, the token payload datastructure configured to comprise data from the first token envelope datastructure and from the second token envelope datastructure.

28. The medium of embodiment 27, further, comprising:
the processor-executable instructions configured to:
  obtain, via at least one processor, a tokenized data retokenization request datastructure, the tokenized data retokenization request datastructure configured to specify the data type instance;
  update, via at least one processor, an active data tokenization key token for the data type instance to the second data tokenization key token;
  generate, via at least one processor, a third data tokenization key token for the data type instance;
  replace, via at least one processor, the first data tokenization key token with the third data tokenization key token in a set of data tokenization key tokens associated with the data type instance;
  calculate, via at least one processor, the plaintext data value using the active data tokenization key token for the data type instance and the second tokenized data value from the token payload datastructure;
  generate, via at least one processor, a third tokenized data value of the plaintext data value by translating the plaintext data value from the plaintext alphabet to a third shifted ciphertext data alphabet generated by shifting the third data tokenization key token using a third data shift position;
  generate, via at least one processor, a third token envelope datastructure, the third token envelope datastructure configured to comprise the third tokenized data value and the third data shift position; and
  store, via at least one processor, an updated token payload datastructure, the updated token payload datastructure configured to comprise data from the second token envelope datastructure and from the third token envelope datastructure.

29. The medium of embodiment 16, further, comprising:
the processor-executable instructions configured to:
  obtain, via at least one processor, a detokenized data retrieval request datastructure, the detokenized data retrieval request datastructure configured to specify a field that stores the first token envelope datastructure;
  determine, via at least one processor, an active data tokenization key token for the data type instance, the active data tokenization key token is configured to be the first data tokenization key token;
  retrieve, via at least one processor, the first data shift position from the first token envelope datastructure;
  retrieve, via at least one processor, the first tokenized data value from the first token envelope datastructure; and
  calculate, via at least one processor, the plaintext data value by translating the first tokenized data value from the first shifted ciphertext data alphabet generated by shifting the active data tokenization key token using the first data shift position to the plaintext alphabet.

30. The medium of embodiment 29, further, comprising:
the active data tokenization key token for the data type instance is configured to be one of a plurality of data tokenization key tokens associated with the data type instance.

31. A vaultless data tokenization processor-implemented system, comprising:
means to process processor-executable instructions;
means to issue processor-issuable instructions from a processor-executable component collection via the means to process processor-executable instructions, the processor-issuable instructions configured to:
  obtain, via at least one processor, a tokenized data storage request datastructure, the tokenized data storage request datastructure configured to specify a plaintext data value;
  determine, via at least one processor, a data type of the plaintext data value, the data type is configured to be associated with a first cryptographic key;
  determine, via at least one processor, a data type instance of the plaintext data value, the data type instance is configured to be associated with a second cryptographic key;
  determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
  calculate, via at least one processor, a first data shift position for the first data tokenization key token, the first data shift position is configured to be calculated by applying a hash function to the combination of the first data tokenization key token and the plaintext data value;
  generate, via at least one processor, a first tokenized data value by translating the plaintext data value from the plaintext alphabet to a first shifted ciphertext data alphabet generated by shifting the first data tokenization key token using the first data shift position; and
  generate, via at least one processor, a first token envelope datastructure, the first token envelope datastructure configured to comprise the first tokenized data value and the first data shift position.

32. The system of embodiment 31, further, comprising:
the means to issue the processor-issuable instructions from the processor-executable component collection, the processor-issuable instructions configured to:
  store, via at least one processor, the first token envelope datastructure in a database.

33. The system of embodiment 31, further, comprising:
the tokenized data storage request datastructure is configured as a SQL-based database command.

34. The system of embodiment 31, further, comprising:
the data type and the data type instance are configured to be determined based on a definition of a database field associated with the plaintext data value.

35. The system of embodiment 31, further, comprising:
the data type is configured to be defined by a character set.

36. The system of embodiment 35, further, comprising:
the data type instance is configured as one of a plurality of data type instances associated with the character set.

37. The system of embodiment 31, further, comprising:
the instructions to determine the first data tokenization key token are configured to comprise instructions to retrieve the first data tokenization key token from a cache.

38. The system of embodiment 31, further, comprising:
the instructions to determine the first data tokenization key token are configured to comprise instructions to:
  retrieve, via at least one processor, the first cryptographic key from a first secure location;
  retrieve, via at least one processor, the second cryptographic key from a second secure location;
  calculate, via at least one processor, a first master shift position for the first cryptographic key, the first master shift position is configured to be calculated by applying the hash function to the combination of the first cryptographic key and the second cryptographic key;
  determine, via at least one processor, the plaintext alphabet associated with the data type; and
  generate, via at least one processor, the first data tokenization key token by translating the second cryptographic key from the plaintext alphabet to the shifted ciphertext master alphabet generated by shifting the first cryptographic key using the first master shift position.

39. The system of embodiment 38, further, comprising:
the first secure location is configured as one of a hardware security module, a key management service, a secured database table.

40. The system of embodiment 38, further, comprising:
the first secure location and the second secure location are configured as the same location.

41. The system of embodiment 31, further, comprising:
the means to issue the processor-issuable instructions from the processor-executable component collection, the processor-issuable instructions configured to:
  determine, via at least one processor, a subset of the plaintext data value to tokenize,
  the first data shift position is configured to be calculated by applying the hash function to the combination of the first data tokenization key token and the subset of the plaintext data value, and
  the first tokenized data value is configured to be generated by translating the subset of the plaintext data value from the plaintext alphabet to the first shifted ciphertext data alphabet.

42. The system of embodiment 31, further, comprising:
the means to issue the processor-issuable instructions from the processor-executable component collection, the processor-issuable instructions configured to:
  determine, via at least one processor, a second data tokenization key token for the data type instance, the data type instance is configured to be associated with a third cryptographic key, the second data tokenization key token is configured to be generated by translating the third cryptographic key from a plaintext alphabet associated with the data type to a second shifted ciphertext master alphabet generated using the first cryptographic key and the third cryptographic key;
  calculate, via at least one processor, a second data shift position for the second data tokenization key token, the second data shift position is configured to be calculated by applying the hash function to the combination of the second data tokenization key token and the plaintext data value;
  generate, via at least one processor, a second tokenized data value by translating the plaintext data value from the plaintext alphabet to a second shifted ciphertext data alphabet generated by shifting the second data tokenization key token using the second data shift position;
  generate, via at least one processor, a second token envelope datastructure, the second token envelope datastructure configured to comprise the second tokenized data value and the second data shift position; and
  store, via at least one processor, a token payload datastructure, the token payload datastructure configured to comprise data from the first token envelope datastructure and from the second token envelope datastructure.

43. The system of embodiment 42, further, comprising:
the means to issue the processor-issuable instructions from the processor-executable component collection, the processor-issuable instructions configured to:
  obtain, via at least one processor, a tokenized data retokenization request datastructure, the tokenized data retokenization request datastructure configured to specify the data type instance;
  update, via at least one processor, an active data tokenization key token for the data type instance to the second data tokenization key token;
  generate, via at least one processor, a third data tokenization key token for the data type instance;
  replace, via at least one processor, the first data tokenization key token with the third data tokenization key token in a set of data tokenization key tokens associated with the data type instance;
  calculate, via at least one processor, the plaintext data value using the active data tokenization key token for the data type instance and the second tokenized data value from the token payload datastructure;
  generate, via at least one processor, a third tokenized data value of the plaintext data value by translating the plaintext data value from the plaintext alphabet to a third shifted ciphertext data alphabet generated by shifting the third data tokenization key token using a third data shift position;
  generate, via at least one processor, a third token envelope datastructure, the third token envelope datastructure configured to comprise the third tokenized data value and the third data shift position; and
  store, via at least one processor, an updated token payload datastructure, the updated token payload datastructure configured to comprise data from the second token envelope datastructure and from the third token envelope datastructure.

44. The system of embodiment 31, further, comprising:
the means to issue the processor-issuable instructions from the processor-executable component collection, the processor-issuable instructions configured to:
  obtain, via at least one processor, a detokenized data retrieval request datastructure, the detokenized data retrieval request datastructure configured to specify a field that stores the first token envelope datastructure;
  determine, via at least one processor, an active data tokenization key token for the data type instance, the active data tokenization key token is configured to be the first data tokenization key token;
  retrieve, via at least one processor, the first data shift position from the first token envelope datastructure;
  retrieve, via at least one processor, the first tokenized data value from the first token envelope datastructure; and
  calculate, via at least one processor, the plaintext data value by translating the first tokenized data value from the first shifted ciphertext data alphabet generated by shifting the active data tokenization key token using the first data shift position to the plaintext alphabet.

45. The system of embodiment 44, further, comprising:
the active data tokenization key token for the data type instance is configured to be one of a plurality of data tokenization key tokens associated with the data type instance.

46. A vaultless data tokenization processor-implemented method, comprising executing processor-executable instructions to:
  obtain, via at least one processor, a tokenized data storage request datastructure, the tokenized data storage request datastructure configured to specify a plaintext data value;
  determine, via at least one processor, a data type of the plaintext data value, the data type is configured to be associated with a first cryptographic key;
  determine, via at least one processor, a data type instance of the plaintext data value, the data type instance is configured to be associated with a second cryptographic key;
  determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
  calculate, via at least one processor, a first data shift position for the first data tokenization key token, the first data shift position is configured to be calculated by applying a hash function to the combination of the first data tokenization key token and the plaintext data value;
  generate, via at least one processor, a first tokenized data value by translating the plaintext data value from the plaintext alphabet to a first shifted ciphertext data alphabet generated by shifting the first data tokenization key token using the first data shift position; and
  generate, via at least one processor, a first token envelope datastructure, the first token envelope datastructure configured to comprise the first tokenized data value and the first data shift position.

47. The method of embodiment 46, further, comprising executing processor-executable instructions to:
  store, via at least one processor, the first token envelope datastructure in a database.

48. The method of embodiment 46, further, comprising:
the tokenized data storage request datastructure is configured as a SQL-based database command.

49. The method of embodiment 46, further, comprising:
the data type and the data type instance are configured to be determined based on a definition of a database field associated with the plaintext data value.

50. The method of embodiment 46, further, comprising:
the data type is configured to be defined by a character set.

51. The method of embodiment 50, further, comprising:
the data type instance is configured as one of a plurality of data type instances associated with the character set.

52. The method of embodiment 46, further, comprising:
the instructions to determine the first data tokenization key token are configured to comprise instructions to retrieve the first data tokenization key token from a cache.

53. The method of embodiment 46, further, comprising:
the instructions to determine the first data tokenization key token are configured to comprise instructions to:
  retrieve, via at least one processor, the first cryptographic key from a first secure location;
  retrieve, via at least one processor, the second cryptographic key from a second secure location;
  calculate, via at least one processor, a first master shift position for the first cryptographic key, the first master shift position is configured to be calculated by applying the hash function to the combination of the first cryptographic key and the second cryptographic key;

determine, via at least one processor, the plaintext alphabet associated with the data type; and
generate, via at least one processor, the first data tokenization key token by translating the second cryptographic key from the plaintext alphabet to the shifted ciphertext master alphabet generated by shifting the first cryptographic key using the first master shift position.
54. The method of embodiment 53, further, comprising:
the first secure location is configured as one of a hardware security module, a key management service, a secured database table.
55. The method of embodiment 53, further, comprising:
the first secure location and the second secure location are configured as the same location.
56. The method of embodiment 46, further, comprising executing processor-executable instructions to:
determine, via at least one processor, a subset of the plaintext data value to tokenize,
the first data shift position is configured to be calculated by applying the hash function to the combination of the first data tokenization key token and the subset of the plaintext data value, and
the first tokenized data value is configured to be generated by translating the subset of the plaintext data value from the plaintext alphabet to the first shifted ciphertext data alphabet.
57. The method of embodiment 46, further, comprising executing processor-executable instructions to:
determine, via at least one processor, a second data tokenization key token for the data type instance, the data type instance is configured to be associated with a third cryptographic key, the second data tokenization key token is configured to be generated by translating the third cryptographic key from a plaintext alphabet associated with the data type to a second shifted ciphertext master alphabet generated using the first cryptographic key and the third cryptographic key;
calculate, via at least one processor, a second data shift position for the second data tokenization key token, the second data shift position is configured to be calculated by applying the hash function to the combination of the second data tokenization key token and the plaintext data value;
generate, via at least one processor, a second tokenized data value by translating the plaintext data value from the plaintext alphabet to a second shifted ciphertext data alphabet generated by shifting the second data tokenization key token using the second data shift position;
generate, via at least one processor, a second token envelope datastructure, the second token envelope datastructure configured to comprise the second tokenized data value and the second data shift position; and
store, via at least one processor, a token payload datastructure, the token payload datastructure configured to comprise data from the first token envelope datastructure and from the second token envelope datastructure.
58. The method of embodiment 57, further, comprising executing processor-executable instructions to:
obtain, via at least one processor, a tokenized data retokenization request datastructure, the tokenized data retokenization request datastructure configured to specify the data type instance;
update, via at least one processor, an active data tokenization key token for the data type instance to the second data tokenization key token;
generate, via at least one processor, a third data tokenization key token for the data type instance;
replace, via at least one processor, the first data tokenization key token with the third data tokenization key token in a set of data tokenization key tokens associated with the data type instance;
calculate, via at least one processor, the plaintext data value using the active data tokenization key token for the data type instance and the second tokenized data value from the token payload datastructure;
generate, via at least one processor, a third tokenized data value of the plaintext data value by translating the plaintext data value from the plaintext alphabet to a third shifted ciphertext data alphabet generated by shifting the third data tokenization key token using a third data shift position;
generate, via at least one processor, a third token envelope datastructure, the third token envelope datastructure configured to comprise the third tokenized data value and the third data shift position; and
store, via at least one processor, an updated token payload datastructure, the updated token payload datastructure configured to comprise data from the second token envelope datastructure and from the third token envelope datastructure.
59. The method of embodiment 46, further, comprising executing processor-executable instructions to:
obtain, via at least one processor, a detokenized data retrieval request datastructure, the detokenized data retrieval request datastructure configured to specify a field that stores the first token envelope datastructure;
determine, via at least one processor, an active data tokenization key token for the data type instance, the active data tokenization key token is configured to be the first data tokenization key token;
retrieve, via at least one processor, the first data shift position from the first token envelope datastructure;
retrieve, via at least one processor, the first tokenized data value from the first token envelope datastructure; and
calculate, via at least one processor, the plaintext data value by translating the first tokenized data value from the first shifted ciphertext data alphabet generated by shifting the active data tokenization key token using the first data shift position to the plaintext alphabet.
60. The method of embodiment 59, further, comprising:
the active data tokenization key token for the data type instance is configured to be one of a plurality of data tokenization key tokens associated with the data type instance.

In order to address various issues and advance the art, the entirety of this application for Shifting Substitution Cipher Based Efficient Vaultless Data Tokenization Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a VDT individual and/or enterprise user, database configuration and/or relational model, data type, data transmission and/or network framework, syntax structure, and/or the like, various embodiments of the VDT, may be implemented that allow a great deal of flexibility and customization. For example, aspects of the VDT may be adapted for a variety of database systems and programming languages. While various embodiments and discussions of the VDT have included information security, however, it is to be understood that the embodiments described herein may be readily configured and/or customized for a wide variety of other applications and/or implementations.

What is claimed is:

1. A vaultless data tokenization apparatus, comprising:
a memory;
a component collection in the memory;
a processor disposed in communication with the memory and configured to issue a plurality of processor-executable instructions from the component collection, the processor-executable instructions configured to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

2. The apparatus of claim 1, further, comprising:
the processor-executable instructions configured to:
store, via at least one processor, the first token envelope datastructure in a database.

3. The apparatus of claim 1, further, comprising:
the tokenized data storage request datastructure is configured as a SQL-based database command.

4. The apparatus of claim 1, further, comprising:
the data type and the data type instance are configured to be determined based on a definition of a database field associated with the plaintext data value.

5. The apparatus of claim 1, further, comprising:
the data type is configured to be defined by a character set.

6. The apparatus of claim 5, further, comprising:
the data type instance is configured as one of a plurality of data type instances associated with the character set.

7. The apparatus of claim 1, further, comprising:
the instructions to determine the first data tokenization key token are configured to comprise instructions to retrieve the first data tokenization key token from a cache.

8. The apparatus of claim 1, further, comprising:
the instructions to determine the first data tokenization key token are configured to comprise instructions to:
  retrieve, via at least one processor, the first cryptographic key from a first secure location;
  retrieve, via at least one processor, the second cryptographic key from a second secure location;
  calculate, via at least one processor, a first master shift position for the first cryptographic key, the first master shift position is configured to be calculated by applying the hash function to the combination of the first cryptographic key and the second cryptographic key;
  determine, via at least one processor, the plaintext alphabet associated with the data type; and
  generate, via at least one processor, the first data tokenization key token by translating the second cryptographic key from the plaintext alphabet to the shifted ciphertext master alphabet generated by shifting the first cryptographic key using the first master shift position.

9. The apparatus of claim 8, further, comprising:
the first secure location is configured as one of a hardware security module, a key management service, a secured database table.

10. The apparatus of claim 8, further, comprising:
the first secure location and the second secure location are configured as the same location.

11. The apparatus of claim 1, further, comprising:
the processor-executable instructions configured to:
  determine, via at least one processor, a subset of the plaintext data value to tokenize,
    the first data shift position is configured to be calculated by applying the hash function to the combination of the first data tokenization key token and the subset of the plaintext data value, and
    the first tokenized data value is configured to be generated by translating the subset of the plaintext data value from the plaintext alphabet to the first shifted ciphertext data alphabet.

12. The apparatus of claim 1, further, comprising:
the processor-executable instructions configured to:
  determine, via at least one processor, a second data tokenization key token for the data type instance, the data type instance is configured to be associated with a third cryptographic key, the second data tokenization key token is configured to be generated by translating the third cryptographic key from a plaintext alphabet associated with the data type to a second shifted ciphertext master alphabet generated using the first cryptographic key and the third cryptographic key;
  calculate, via at least one processor, a second data shift position for the second data tokenization key token, the second data shift position is configured to be calculated by applying the hash function to the combination of the second data tokenization key token and the plaintext data value;
  generate, via at least one processor, a second tokenized data value by translating the plaintext data value from the plaintext alphabet to a second shifted ciphertext data alphabet generated by shifting the second data tokenization key token using the second data shift position;
  generate, via at least one processor, a second token envelope datastructure, the second token envelope datastructure configured to comprise the second tokenized data value and the second data shift position; and
  store, via at least one processor, a token payload datastructure, the token payload datastructure configured to comprise data from the first token envelope datastructure and from the second token envelope datastructure.

13. The apparatus of claim 12, further, comprising:
the processor-executable instructions configured to:
  obtain, via at least one processor, a tokenized data retokenization request datastructure, the tokenized data retokenization request datastructure configured to specify the data type instance;
  update, via at least one processor, an active data tokenization key token for the data type instance to the second data tokenization key token;
  generate, via at least one processor, a third data tokenization key token for the data type instance;
  replace, via at least one processor, the first data tokenization key token with the third data tokenization key token in a set of data tokenization key tokens associated with the data type instance;
  calculate, via at least one processor, the plaintext data value using the active data tokenization key token for the data type instance and the second tokenized data value from the token payload datastructure;
  generate, via at least one processor, a third tokenized data value of the plaintext data value by translating the plaintext data value from the plaintext alphabet to a third shifted ciphertext data alphabet generated by shifting the third data tokenization key token using a third data shift position;
  generate, via at least one processor, a third token envelope datastructure, the third token envelope datastructure configured to comprise the third tokenized data value and the third data shift position; and
  store, via at least one processor, an updated token payload datastructure, the updated token payload datastructure configured to comprise data from the second token envelope datastructure and from the third token envelope datastructure.

14. The apparatus of claim 1, further, comprising:
the processor-executable instructions configured to:
  obtain, via at least one processor, a detokenized data retrieval request datastructure, the detokenized data retrieval request datastructure configured to specify a field that stores the first token envelope datastructure;
  determine, via at least one processor, an active data tokenization key token for the data type instance, the active data tokenization key token is configured to be the first data tokenization key token;
  retrieve, via at least one processor, the first data shift position from the first token envelope datastructure;
  retrieve, via at least one processor, the first tokenized data value from the first token envelope datastructure; and calculate, via at least one processor, the plaintext data value by translating the first tokenized data value from the first shifted ciphertext data alphabet generated by shifting the active data tokenization key token using the first data shift position to the plaintext alphabet.

15. The apparatus of claim 14, further, comprising:
the active data tokenization key token for the data type instance is configured to be one of a plurality of data tokenization key tokens associated with the data type instance.

16. A processor-readable vaultless data tokenization non-transient medium, comprising processor-executable instructions configured to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

17. A vaultless data tokenization processor-implemented system, comprising:
means to process processor-executable instructions;
means to issue processor-issuable instructions from a processor-executable component collection via the means to process processor-executable instructions, the processor-issuable instructions configured to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

18. A vaultless data tokenization processor-implemented process, comprising executing processor-executable instructions to:
obtain, via at least one processor, a tokenized data storage request datastructure, the tokenized data storage request datastructure configured to specify a plaintext data value;
determine, via at least one processor, a data type of the plaintext data value, the data type is configured to be associated with a first cryptographic key;
determine, via at least one processor, a data type instance of the plaintext data value, the data type instance is configured to be associated with a second cryptographic key;
determine, via at least one processor, a first data tokenization key token for the data type instance, the first data tokenization key token is configured to be generated by translating the second cryptographic key from a plaintext alphabet associated with the data type to a first shifted ciphertext master alphabet generated using the first cryptographic key and the second cryptographic key;
calculate, via at least one processor, a first data shift position for the first data tokenization key token, the first data shift position is configured to be calculated by applying a hash function to the combination of the first data tokenization key token and the plaintext data value;
generate, via at least one processor, a first tokenized data value by translating the plaintext data value from the plaintext alphabet to a first shifted ciphertext data alphabet generated by shifting the first data tokenization key token using the first data shift position; and
generate, via at least one processor, a first token envelope datastructure, the first token envelope datastructure configured to comprise the first tokenized data value and the first data shift position.

* * * * *